(12) United States Patent
Saito

(10) Patent No.: US 7,782,488 B2
(45) Date of Patent: Aug. 24, 2010

(54) PRINT CONTROL DEVICE AND PRINT CONTROL METHOD

(75) Inventor: Kazuyuki Saito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 586 days.

(21) Appl. No.: 11/755,994

(22) Filed: May 31, 2007

(65) Prior Publication Data
US 2007/0285724 A1 Dec. 13, 2007

(30) Foreign Application Priority Data
Jun. 7, 2006 (JP) ............... 2006-159140

(51) Int. Cl.
*H04N 1/40* (2006.01)
(52) U.S. Cl. .................. 358/1.9; 358/468; 358/304
(58) Field of Classification Search .................. 358/1.9, 358/2.1, 468, 304, 488, 498
See application file for complete search history.

(56) References Cited

U.S. PATENT DOCUMENTS 5,068,743 A * 11/1991 Araki .................. 358/304

5,447,383 A * 9/1995 Hirono et al. ............... 400/621

FOREIGN PATENT DOCUMENTS

| JP | 07-314844 A | 12/1995 |
|---|---|---|
| JP | 08-115190 A | 5/1996 |
| JP | 2001-096859 A | 4/2001 |
| JP | 2002-142096 A | 5/2002 |
| JP | 2002-283642 A | 10/2002 |

* cited by examiner

*Primary Examiner*—Thomas D Lee
*Assistant Examiner*—Stephen M Brinich
(74) *Attorney, Agent, or Firm*—Canon USA Inc IP Division

(57) ABSTRACT

When image formation is to be carried out based on multiple print jobs that have been inputted, multi-imposition print data is generated in which the multiple print jobs are arranged in a single sheet layout, and cutting sheet data is generated based on positions of the multiple print jobs arranged in the single sheet layout in the generated multi-imposition print data. Then, control is performed over printing of the generated multi-imposition print data and insertion printing of the generated cutting sheet data.

17 Claims, 27 Drawing Sheets

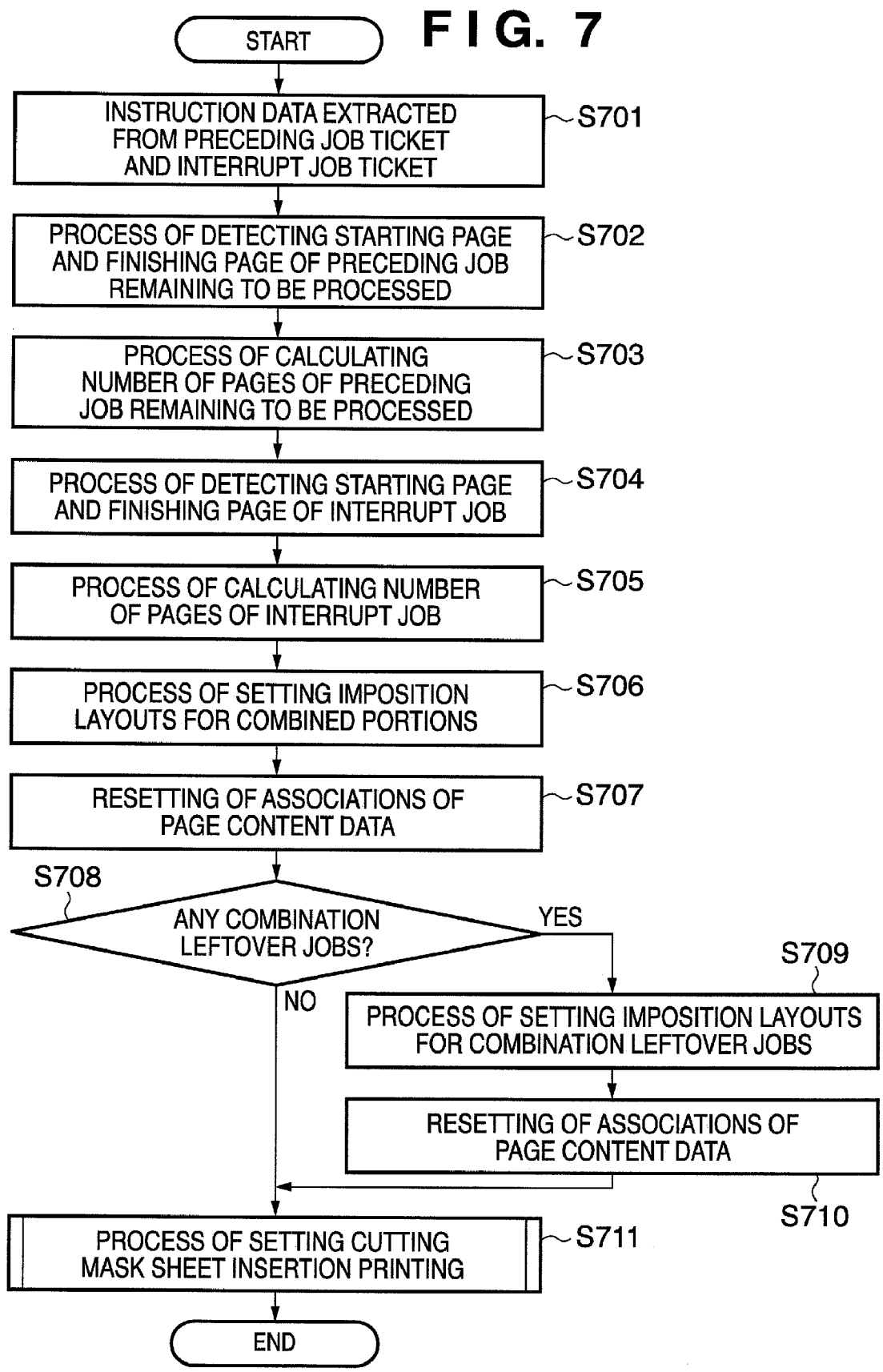

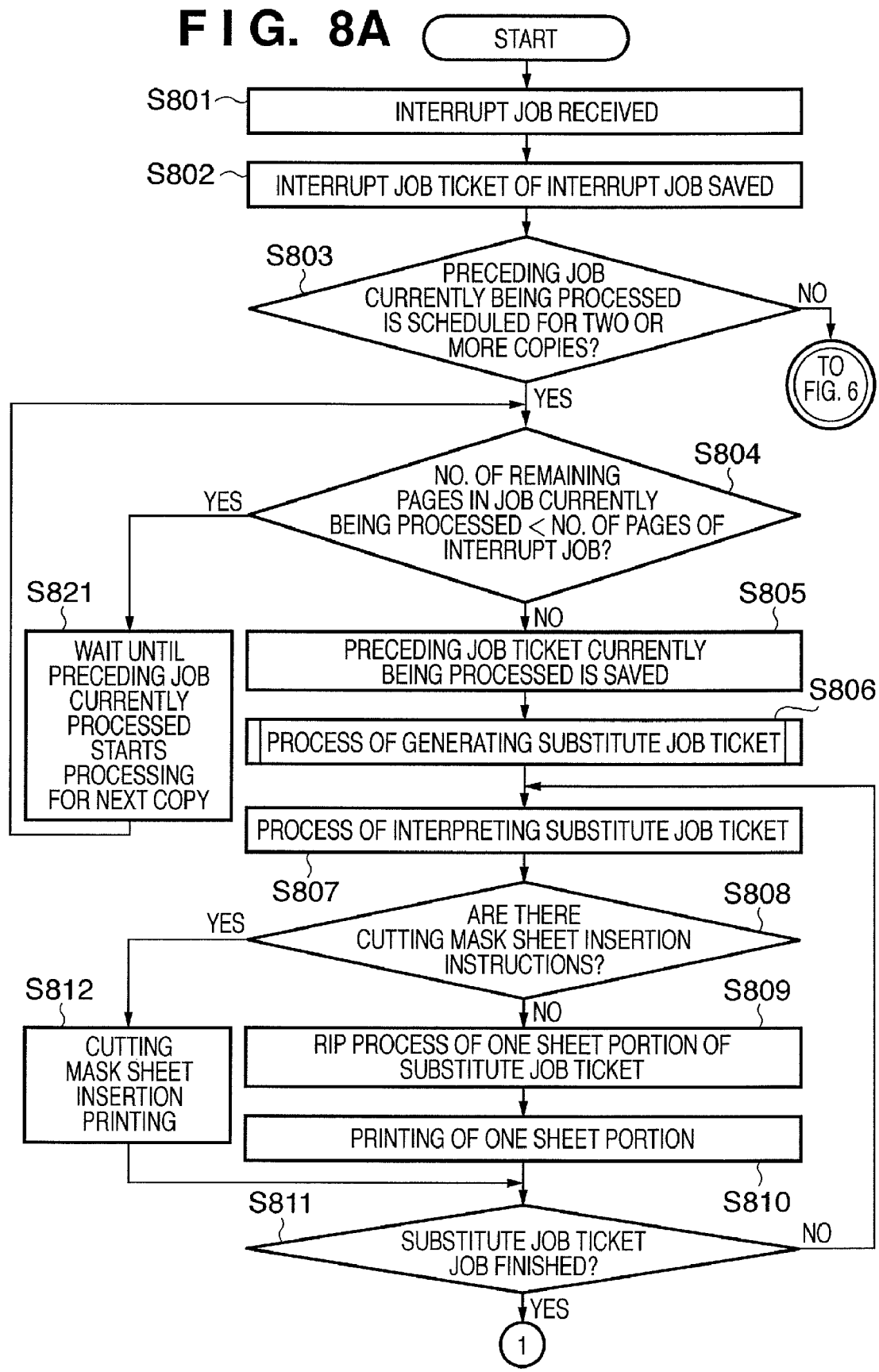

FIG. 16A

EXAMPLE OF SUBSTITUTE JOB TICKET WHEN
JOB A (1000), JOB B (100), JOB C (10)
PAGE 0 TO PAGE 799 OF JOB A PRINTED

```
<?xml version = "1.0" encoding ="UTF-8"?>
<JOB JobID = "SUBSTITUTE 001">
  <LAYOUT RELATED INFORMATION ID = "COMBINATION 001">
    <CHAPTER UNIT INFORMATION>
      <SHEET UNIT INFORMATION ID = "00000">
        <SHEET IMPRESSION UNIT INFORMATION Side = "Front">
          <CONTENT ARRANGEMENT INFORMATION, COORDINATE INFORMATION = "x1 y1 Wa Ha" Ord = "0"/>
          <CONTENT ARRANGEMENT INFORMATION, COORDINATE INFORMATION = "x1 y3 Wa Ha" Ord = "1"/>
          <CONTENT ARRANGEMENT INFORMATION, COORDINATE INFORMATION = "x2 y1 Wa Ha" Ord = "2"/>
          <CONTENT ARRANGEMENT INFORMATION, COORDINATE INFORMATION = "x2 y3 Wa Ha" Ord = "3"/>
        </SHEET IMPRESSION UNIT INFORMATION>
      </SHEET UNIT INFORMATION>
      ★
         ...
      <SHEET UNIT INFORMATION ID = "00200">
        <SHEET IMPRESSION UNIT INFORMATION Side = "Front">
          <CONTENT ARRANGEMENT INFORMATION, COORDINATE INFORMATION = "x1 y1 Wa Ha" Ord = "800"/>
          <CONTENT ARRANGEMENT INFORMATION, COORDINATE INFORMATION = "x1 y3 Wa Ha" Ord = "801"/>
          <CONTENT ARRANGEMENT INFORMATION, COORDINATE INFORMATION = "x2 y1 Wb Hb" Ord = "0"/>
          <CONTENT ARRANGEMENT INFORMATION, COORDINATE INFORMATION = "x2 y2 Wb Hb" Ord = "1"/>
          <CONTENT ARRANGEMENT INFORMATION, COORDINATE INFORMATION = "x2 y3 Wc Hc" Ord = "0"/>
          <CONTENT ARRANGEMENT INFORMATION, COORDINATE INFORMATION = "x3 y3 Wc Hc" Ord = "1"/>
        </SHEET IMPRESSION UNIT INFORMATION>
      </SHEET UNIT INFORMATION>
      ★
```

```
<SHEET UNIT INFORMATION ID = "00204">
  <SHEET IMPRESSION UNIT INFORMATION Side = "Front">
    <CONTENT ARRANGEMENT INFORMATION, COORDINATE INFORMATION = "x1 y1 Wa Ha" Ord = "808"/>
    <CONTENT ARRANGEMENT INFORMATION, COORDINATE INFORMATION = "x1 y3 Wa Ha" Ord = "809"/>
    <CONTENT ARRANGEMENT INFORMATION, COORDINATE INFORMATION = "x2 y1 Wb Hb" Ord = "8"/>
    <CONTENT ARRANGEMENT INFORMATION, COORDINATE INFORMATION = "x2 y2 Wb Hb" Ord = "9"/>
    <CONTENT ARRANGEMENT INFORMATION, COORDINATE INFORMATION = "x2 y3 Wc Hc" Ord = "8"/>
    <CONTENT ARRANGEMENT INFORMATION, COORDINATE INFORMATION = "x3 y3 Wc Hc" Ord = "9"/>
  </SHEET IMPRESSION UNIT INFORMATION>
</SHEET UNIT INFORMATION>
<SHEET UNIT INFORMATION ID = "00205">
  <SHEET IMPRESSION UNIT INFORMATION Side = "Front">
    <CONTENT ARRANGEMENT INFORMATION, COORDINATE INFORMATION = "x1 y1 Wa Ha" Ord = "810"/>
    <CONTENT ARRANGEMENT INFORMATION, COORDINATE INFORMATION = "x1 y3 Wa Ha" Ord = "811"/>
    <CONTENT ARRANGEMENT INFORMATION, COORDINATE INFORMATION = "x2 y1 Wb Hb" Ord = "10"/>
    <CONTENT ARRANGEMENT INFORMATION, COORDINATE INFORMATION = "x2 y2 Wb Hb" Ord = "11"/>
    <CONTENT ARRANGEMENT INFORMATION, COORDINATE INFORMATION = "x2 y3 Wb Hb" Ord = "12"/>
    <CONTENT ARRANGEMENT INFORMATION, COORDINATE INFORMATION = "x2 y4 Wb Hb" Ord = "13"/>
  </SHEET IMPRESSION UNIT INFORMATION>
</SHEET UNIT INFORMATION>
```

```xml
<SHEET UNIT INFORMATION ID = "00227">
  <SHEET IMPRESSION UNIT INFORMATION Side = "Front">
    <CONTENT ARRANGEMENT INFORMATION, COORDINATE INFORMATION = "x1 y1 Wa Ha" Ord = "854"/>
    <CONTENT ARRANGEMENT INFORMATION, COORDINATE INFORMATION = "x1 y3 Wa Ha" Ord = "855"/>
    <CONTENT ARRANGEMENT INFORMATION, COORDINATE INFORMATION = "x2 y1 Wb Hb" Ord = "98"/>
    <CONTENT ARRANGEMENT INFORMATION, COORDINATE INFORMATION = "x2 y2 Wb Hb" Ord = "99"/>
    <CONTENT ARRANGEMENT INFORMATION, COORDINATE INFORMATION = "x2 y3 Wb Hb" Ord = "dummy"/>
    <CONTENT ARRANGEMENT INFORMATION, COORDINATE INFORMATION = "x2 y4 Wb Hb" Ord = "dummy"/>
  </SHEET IMPRESSION UNIT INFORMATION>
</SHEET UNIT INFORMATION>
<SHEET UNIT INFORMATION ID = "00228">
  <SHEET IMPRESSION UNIT INFORMATION Side = "Front">
    <CONTENT ARRANGEMENT INFORMATION, COORDINATE INFORMATION = "x1 y1 Wa Ha" Ord = "856"/>
    <CONTENT ARRANGEMENT INFORMATION, COORDINATE INFORMATION = "x1 y3 Wa Ha" Ord = "857"/>
    <CONTENT ARRANGEMENT INFORMATION, COORDINATE INFORMATION = "x2 y1 Wa Ha" Ord = "858"/>
    <CONTENT ARRANGEMENT INFORMATION, COORDINATE INFORMATION = "x2 y3 Wa Ha" Ord = "859"/>
  </SHEET IMPRESSION UNIT INFORMATION>
</SHEET UNIT INFORMATION>
```

1605 (bracket indicating the region of the last block)

CONTINUED FROM 1601

```xml
<SHEET UNIT INFORMATION ID = "00264">
  <SHEET IMPRESSION UNIT INFORMATION Side = "Front">
    <CONTENT ARRANGEMENT INFORMATION, COORDINATE INFORMATION = "x1 y1 Wa Ha" Ord = "996"/>
    <CONTENT ARRANGEMENT INFORMATION, COORDINATE INFORMATION = "x1 y3 Wa Ha" Ord = "997"/>
    <CONTENT ARRANGEMENT INFORMATION, COORDINATE INFORMATION = "x2 y1 Wa Ha" Ord = "998"/>
    <CONTENT ARRANGEMENT INFORMATION, COORDINATE INFORMATION = "x2 y3 Wa Ha" Ord = "999"/>
  </SHEET IMPRESSION UNIT INFORMATION>
  </CHAPTER UNIT INFORMATION>
<LAYOUT RELATED INFORMATION>

<CONTENT INFORMATION, TOTAL NO. OF PAGES = "1110">
  <PORTION CONTENT INFORMATION, NO. OF PAGES = "0" "1000" jobID = "ORIGINAL JOB A">
    <PAGE CONTENT DATA ASSOCIATION INFORMATION>
      <FILE URL = "../../JOB A.pdf"/>
    </PAGE CONTENT DATA ASSOCIATION INFORMATION>
  </PORTION CONTENT INFORMATION>
  <PORTION CONTENT INFORMATION, NO. OF PAGES = "0" "100" jobID = "ORIGINAL JOB B">
    <PAGE CONTENT DATA ASSOCIATION INFORMATION>
      <FILE URL = "../../JOB B.pdf"/>
    </PAGE CONTENT DATA ASSOCIATION INFORMATION>
  </PORTION CONTENT INFORMATION>
  <PORTION CONTENT INFORMATION, NO. OF PAGES = "0" "10" jobID = "ORIGINAL JOB C">
    <PAGE CONTENT DATA ASSOCIATION INFORMATION>
      <FILE URL = "../../JOB C.pdf"/>
    </PAGE CONTENT DATA ASSOCIATION INFORMATION>
  </PORTION CONTENT INFORMATION>
</CONTENT INFORMATION>
```

FIG. 17B

```
<PROCESS CONTROL INSTRUCTION>
    <IMPOSITION PROCESS            .../>
    <PDL INTERPRETER PROCESS       .../>
    <RIP PROCESS                   .../>
    <PRINTING PROCESS
        <CUTTING MASK SHEET INSERTION PRINTING PROCESS,
            INSERTION SHEET ID = "00000" OUTPUT BIN = "BIN1"   .../>
        <NORMAL SHEET PRINTING PROCESS,
            SHEET ID = "00000 TO 00199" OUTPUT BIN = "BIN1"    .../>
        <CUTTING MASK SHEET INSERTION PRINTING PROCESS,
            INSERTION SHEET ID = "00200" OUTPUT BIN = "BIN2"   .../>
        <NORMAL SHEET PRINTING PROCESS,
            SHEET ID = "00200 TO 00204" OUTPUT BIN = "BIN2"    .../>
        <CUTTING MASK SHEET INSERTION PRINTING PROCESS,
            INSERTION SHEET ID = "00205" OUTPUT BIN = "BIN3"   .../>
        <NORMAL SHEET PRINTING PROCESS,
            SHEET ID = "00205 TO 00227" OUTPUT BIN = "BIN3"    .../>
        <CUTTING MASK SHEET INSERTION PRINTING PROCESS,
            INSERTION SHEET ID = "00228" OUTPUT BIN = "BIN4"   .../>
        <NORMAL SHEET PRINTING PROCESS,
            SHEET ID = "00228 TO 00264" OUTPUT BIN = "BIN4"    .../>
    </PRINTING PROCESS>
    <CUTTING PROCESS                .../>
</PROCESS CONTROL INSTRUCTION>
</JOB>
```

FIG. 18A

EXAMPLE OF SUBSTITUTE JOB TICKET WHEN
SHEET NUMBER LIMITATION OF SHEET CUTTING DEVICE IS 500
JOB A (2000), JOB B (2000), JOB C (2000)

Xe − Xs + 1 + 1
498 − 0 + 1 + 1 = 500

Xe = 500 + Xs − 2
997

```
<?xml version = "1.0" encoding = "UTF-8"?>
<JOB JobID = "SUBSTITUTE 001">
  <LAYOUT RELATED INFORMATION ID = "COMBINATION 001">
    <CHAPTER UNIT INFORMATION>
      <SHEET UNIT INFORMATION ID = "00000">
        <SHEET IMPRESSION UNIT INFORMATION Side = "Front">
          <CONTENT ARRANGEMENT INFORMATION, COORDINATE INFORMATION = "x1 y1 Wa Ha" Ord = "0"/>
          <CONTENT ARRANGEMENT INFORMATION, COORDINATE INFORMATION = "x1 y3 Wa Ha" Ord = "1"/>
          <CONTENT ARRANGEMENT INFORMATION, COORDINATE INFORMATION = "x2 y1 Wb Hb" Ord = "2000"/>
          <CONTENT ARRANGEMENT INFORMATION, COORDINATE INFORMATION = "x2 y2 Wb Hb" Ord = "2001"/>
          <CONTENT ARRANGEMENT INFORMATION, COORDINATE INFORMATION = "x2 y3 Wc Hc" Ord = "4000"/>
          <CONTENT ARRANGEMENT INFORMATION, COORDINATE INFORMATION = "x3 y3 Wc Hc" Ord = "4001"/>
        </SHEET IMPRESSION UNIT INFORMATION>
      </SHEET UNIT INFORMATION>
```

FIG. 18B

```xml
<SHEET UNIT INFORMATION ID ="00499"/>
<SHEET IMPRESSION UNIT INFORMATION Side = "Front"/>
    <CONTENT ARRANGEMENT INFORMATION, COORDINATE INFORMATION = "x1 y1 Wa Ha" Ord = "998"/>
    <CONTENT ARRANGEMENT INFORMATION, COORDINATE INFORMATION = "x1 y3 Wa Ha" Ord = "999"/>
    <CONTENT ARRANGEMENT INFORMATION, COORDINATE INFORMATION = "x2 y1 Wb Hb" Ord = "2998"/>
    <CONTENT ARRANGEMENT INFORMATION, COORDINATE INFORMATION = "x2 y2 Wb Hb" Ord = "2999"/>
    <CONTENT ARRANGEMENT INFORMATION, COORDINATE INFORMATION = "x2 y3 Wc Hc" Ord = "4996"/>
    <CONTENT ARRANGEMENT INFORMATION, COORDINATE INFORMATION = "x3 y3 Wc Hc" Ord = "4997"/>
</SHEET IMPRESSION UNIT INFORMATION>
</SHEET UNIT INFORMATION>
⋮
<SHEET UNIT INFORMATION ID ="00998"/>
<SHEET IMPRESSION UNIT INFORMATION Side = "Front"/>
    <CONTENT ARRANGEMENT INFORMATION, COORDINATE INFORMATION = "x1 y1 Wa Ha" Ord = "1996"/>
    <CONTENT ARRANGEMENT INFORMATION, COORDINATE INFORMATION = "x1 y3 Wa Ha" Ord = "1997"/>
    <CONTENT ARRANGEMENT INFORMATION, COORDINATE INFORMATION = "x2 y1 Wb Hb" Ord = "3996"/>
    <CONTENT ARRANGEMENT INFORMATION, COORDINATE INFORMATION = "x2 y2 Wb Hb" Ord = "3997"/>
    <CONTENT ARRANGEMENT INFORMATION, COORDINATE INFORMATION = "x2 y3 Wc Hc" Ord = "5996"/>
    <CONTENT ARRANGEMENT INFORMATION, COORDINATE INFORMATION = "x3 y3 Wc Hc" Ord = "5997"/>
</SHEET IMPRESSION UNIT INFORMATION>
</SHEET UNIT INFORMATION>
```

```xml
<SHEET UNIT INFORMATION ID = "00999">
    ...
    <SHEET IMPRESSION UNIT INFORMATION Side = "Front">
        <CONTENT ARRANGEMENT INFORMATION, COORDINATE INFORMATION = "x1 y1 Wa Ha" Ord = "1998"/>
        <CONTENT ARRANGEMENT INFORMATION, COORDINATE INFORMATION = "x1 y3 Wa Ha" Ord = "1999"/>
        <CONTENT ARRANGEMENT INFORMATION, COORDINATE INFORMATION = "x2 y1 Wb Hb" Ord = "3998"/>
        <CONTENT ARRANGEMENT INFORMATION, COORDINATE INFORMATION = "x2 y2 Wb Hb" Ord = "3999"/>
        <CONTENT ARRANGEMENT INFORMATION, COORDINATE INFORMATION = "x2 y3 Wc Hc" Ord = "5998"/>
        <CONTENT ARRANGEMENT INFORMATION, COORDINATE INFORMATION = "x3 y3 Wc Hc" Ord = "5999"/>
    </SHEET IMPRESSION UNIT INFORMATION>
    ...
</SHEET UNIT INFORMATION>
</CHAPTER UNIT INFORMATION>
</LAYOUT RELATED INFORMATION>
```

F I G. 19A

1901 (CONTINUED FROM 1801)

```
<CONTENT INFORMATION, TOTAL NO. OF PAGES = "6000"/>
  <PORTION CONTENT INFORMATION, NO. OF PAGES = "0" "2000" jobID = "ORIGINAL JOB A">
    <PAGE CONTENT DATA ASSOCIATION INFORMATION>
      <FILE URL = "../../JOB A.pdf"/>
    </PAGE CONTENT DATA ASSOCIATION INFORMATION>
  </PORTION CONTENT INFORMATION>
  <PORTION CONTENT INFORMATION, NO. OF PAGES = "0" "2000" jobID = "ORIGINAL JOB B">
    <PAGE CONTENT DATA ASSOCIATION INFORMATION>
      <FILE URL = "../../JOB B.pdf"/>
    </PAGE CONTENT DATA ASSOCIATION INFORMATION>
  </PORTION CONTENT INFORMATION>
  <PORTION CONTENT INFORMATION, NO. OF PAGES = "0" "2000" jobID = "ORIGINAL JOB C">
    <PAGE CONTENT DATA ASSOCIATION INFORMATION>
      <FILE URL = "../../JOB C.pdf"/>
    </PAGE CONTENT DATA ASSOCIATION INFORMATION>
  </PORTION CONTENT INFORMATION>
</CONTENT INFORMATION>
```

F I G. 19B

```
<PROCESS CONTROL INSTRUCTION>
  <IMPOSITION PROCESS       .../>
  <PDL INTERPRETER PROCESS  .../>
  <RIP PROCESS       .../>
  <PRINTING PROCESS       .../>
    <CUTTING MASK SHEET INSERTION PRINTING PROCESS, INSERTION SHEET ID = "00000"       .../>
    <NORMAL SHEET PRINTING PROCESS, SHEET ID = "00000 TO 00498" OUTPUT BIN = "BIN1"       .../>
    <CUTTING MASK SHEET INSERTION PRINTING PROCESS, INSERTION SHEET ID = "00499"       .../>
    <NORMAL SHEET PRINTING PROCESS, SHEET ID = "00499 TO 00997" OUTPUT BIN = "BIN2"       .../>
    <CUTTING MASK SHEET INSERTION PRINTING PROCESS, INSERTION SHEET ID = "00998"       .../>
    <NORMAL SHEET PRINTING PROCESS, SHEET ID = "00998 TO 00999" OUTPUT BIN = "BIN3"       .../>
  </PRINTING PROCESS>
  <CUTTING PROCESS       .../>
</PROCESS CONTROL INSTRUCTION>
</JOB>
```

PRINT CONTROL DEVICE AND PRINT CONTROL METHOD

BACKGROUND OF THE INVENTION

1. Field of the Invention

The present invention relates to print control devices and print control methods for controlling multi-imposition printing in which multiple sets of print data are arranged on a single sheet of printing paper.

2. Description of the Related Art

Heretofore, in the so-called commercial printing industry, which involves receiving requests to produce printed materials from a third party (a customer or a client) and delivering the printed materials to receive remuneration from the third party, the mainstream has involved using large scale printing apparatuses such as offset plate printing presses and the like. Here, printed materials include magazines, newspapers, catalogs, advertisements, gravure printing, and the like. In the printing industry, work has advanced to involve various processes such as manuscript input, design/layout, comps (presentations based on printer output), proofing (layout corrections and color correction), press proofs (proof printouts), plate making, printing, post-processing tasks, and shipping. Using the aforementioned printing presses necessitates the making of plates and once plates are made, it is not easy to make corrections to them, and this is considerably disadvantageous in terms of cost. For this reason, careful proofing, that is, work involving layout checks and color confirmations, is essential.

Thus, in the printing industry, large-scale equipment is required and to a certain extent time is also required to produce the printed materials that the client desires. Moreover, specialized knowledge has been required for these respective tasks and the know-how of an experienced and skilled person that can be called a craftsman so to speak has been necessary.

On the other hand, recently, along with greater speed and higher quality in electrophotographic and inkjet printing apparatuses, digital printing known as print on demand (POD) is available that competes in the above-described commercial printing industry. Accordingly, a market based on using this digital printing technology for business is beginning to emerge.

POD aims to handle large volume copies and large volume jobs in a short period. In contrast to conventional large scale printing presses and printing techniques, POD makes maximal use of digital image forming apparatuses such as digital copiers and digital multifunction peripherals for example.

Compared to the conventional printing industry, there is greater digital integration in POD and computer based management and control is more established there, and with this use of computers POD is attempting to approach the level of the printing industry to a certain extent. Further still, since plate making is not necessary with POD, it has become desirable to be able to interrupt a job that is undergoing printing and to form a ganged job from that midway point.

It should be noted that ganged job refers to a job in which multiple jobs are arranged on a media being printed, thereby making more efficient use of the media and maintaining overall throughput as much as possible. Furthermore, ganged jobs are one type of multi-imposition printing in which printing is carried out of multiple impressions (pages) on a single sheet of paper.

Furthermore, with POD there is a tendency toward greater networking with cooperation between digital image forming apparatuses and finishers.

However, in cooperating with sheet cutting devices, which are one type of finisher, although cutting sizes and the like are typically sent to the sheet cutting devices in job tickets and the task of setting cutting sizes has been reduced, a series of operator-dependent tasks still remains. This series of tasks involves the actual paper (media) being carried manually by an operator, aligning the edges of the paper in the sheet cutting device, and confirming cutting positions while loading paper into the sheet cutting device and starting the sheet cutting device.

Against this background, there are combining methods (for example, Japanese Patent Application Laid-Open No. 2001-096859 (hereinafter, referred to as "patent document 1")) in which raster data of each page of multiple jobs undergoes logical addition output in page units as a combining method for multiple jobs. Furthermore, there are methods (for example, Japanese Patent Application Laid-Open No. H08-115190 (hereinafter, referred to as "patent document 2")) in which multiple characteristics of a single job that are described by originally multiple job tickets are collected and combined into one.

Furthermore, as a technique for confirming cutting positions, there are techniques (for example, Japanese Patent Application Laid-Open No. 2002-283642 (hereinafter, referred to as "patent document 3")) and Japanese Patent Application Laid-Open No. H07-314844 (hereinafter, referred to as "patent document 4")) in which marks for preventing cutting are printed in pairs on paper and cutting positions are estimated to cut virtual lines made by joining the paired marks. Also, there are techniques (for example, Japanese Patent Application Laid-Open No. 2002-142096 (hereinafter, referred to as "patent document 5")) in which rather than virtual lines, the actual border lines are formed to draw attention to the cutting positions.

However, the above-mentioned conventional technologies do not anticipate cases such as ganged jobs where pages of different jobs are mixed and present on a single medium and the output sheet thereof is to be cut. For this reason, with the method of patent document 1, since raster images of the pages of two jobs would end up combined on a single medium, pages of two jobs cannot be mixed. Furthermore, the method of patent document 2 allows combining settings in which originally a single job is divided into multiples, but it is not capable of generating a combined job ticket that would allow multiple jobs to share a single media.

Furthermore, with ganged jobs, the content of jobs sharing a single media is not limited to pages having the same height and width such that cutting is complicated. Particularly with POD, since plate making is not necessary, unanticipated job changes can occur in conventional printing using plates such as interrupting a job that is undergoing printing to form a ganged job from that midway point. For this reason, with patent documents 3 and 4, in cases of printed materials having complicated cutting layouts and many white spaces or changing the cutting layout while conducting printing, there are the problems of reduced operational efficiency due to an increase in the operational burden of the operator in estimating and checking cutting positions or causing loading mistakes in the sheet cutting device, etc.

Furthermore, in the case of patent document 5, although the operator can recognize the frame lines more easily than the marks if it is a simple cutting layout, there is a risk that frame lines will remain at the time of cutting since the frame lines are directly formed on the print images. Also, it is anticipated that line portions will be drawn from data of the upper edge, lower edge, right edge, and left edge, and simple frame lines in which the line portions intersect will be created.

Thus, in the case of complicated cutting layouts for ganged jobs, no consideration is given to ensuring that line portions do not overlap or that line portions do not extend into the contents where line portions must not be combined.

Furthermore, it is necessary for the operator to pay close attention in order to confirm the cutting positions and must judge with respect to media in which the temporary frame lines are formed whether the lines are line portions inside the intended contents or line portions for cutting, such that problems of reduced operational efficiency have not been resolved after all.

SUMMARY OF THE INVENTION

An embodiment of the present invention provides a system by which, when printed materials that have undergone multi-imposition printing are to be cut, reduces operator cutting errors and improves processing efficiency.

Furthermore, an embodiment of the present invention provides a system by which substitute job tickets are generated and cutting data for newly imposed layouts is sent online to a sheet cutting device cooperating over a network.

According to an aspect of the present invention, an embodiment is directed to a device comprising: a first generating unit adapted to generate, from multiple sets of print data, multi-imposition print data in which the multiple sets of print data are arranged in a single sheet layout, a second generating unit adapted to generate cutting sheet data based on positions of the multiple sets of print data arranged in the single sheet layout in the generated multi-imposition print data, and a print control unit adapted to perform control such that the multi-imposition print data generated by the first generating unit and the cutting sheet data generated by the second generating unit are printed.

Furthermore, according to another aspect of the present invention, an embodiment is directed to a method comprising: generating, from multiple sets of print data, multi-imposition print data in which the multiple sets of print data are arranged in a single sheet layout, generating cutting sheet data based on positions of the multiple sets of print data arranged in the single sheet layout in the generated multi-imposition print data, and performing control such that the multi-imposition print data generated in the first generating step and the cutting sheet data generated by the second generating step are printed.

Further features of the present invention will become apparent from the following description of exemplary embodiments (with reference to the attached drawings).

BRIEF DESCRIPTION OF THE DRAWINGS

FIG. 7 is a flowchart showing the substitute job ticket generating process (S603) shown in FIG. 6.

FIGS. 8A and 8B are a flowchart showing a substitute job ticket sending process according to a third embodiment.

FIGS. 16A to 16C show one example of a substitute job ticket according to the first embodiment.

FIGS. 17A and 17B show one example of a substitute job ticket according to the first embodiment.

FIGS. 18A to 18C show one example of another substitute job ticket according to the first embodiment.

FIGS. 19A and 19B show one example of another substitute job ticket according to the first embodiment.

DESCRIPTION OF THE EMBODIMENTS

Hereinafter, a detailed description of preferred embodiments for executing the present invention is given with reference to the accompanying drawings.

First Embodiment

A first embodiment is described using as an example a multifunction device (MFP), which is equipped with multiple functions, as one example of a print control device according to the present invention.

<Description of System Outline>

Figure 1:
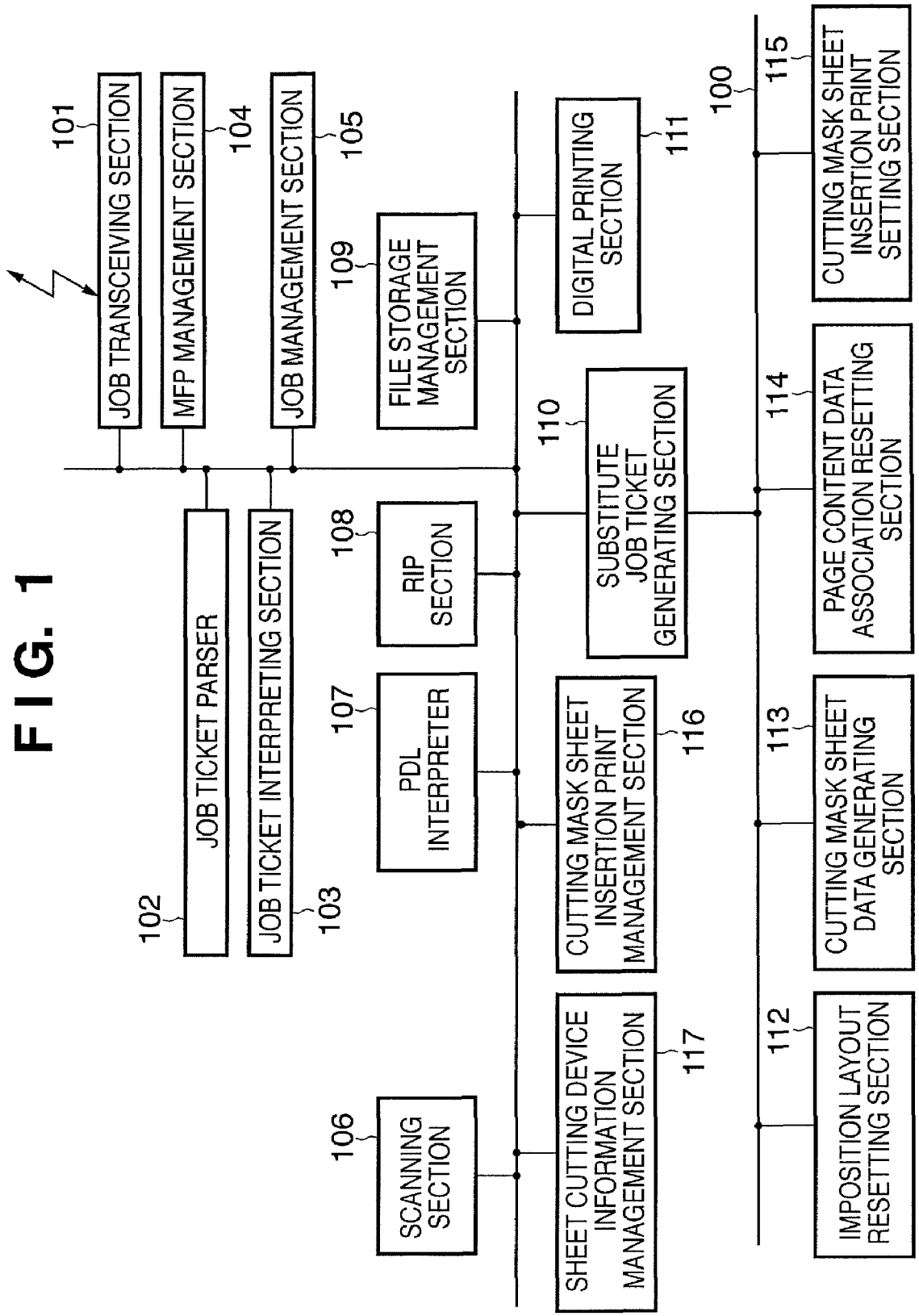
FIG. 1 is a block diagram showing one example of a configuration of a multifunction device (MFP), which is equipped with multiple functions, according to a first embodiment.

FIG. 1 is a block diagram showing one example of a configuration of a multifunction device (hereinafter MFP), which is equipped with multiple functions, according to a first embodiment. The MFP includes a computer device (an information processing unit) having for example components such as a CPU, a ROM, a RAM, and an HD, and the CPU achieves various functions by executing programs contained on the ROM, HD, or other storage medium.

As shown in FIG. 1, components of the MFP are connected by an internal bus 100. Furthermore, the MFP is capable of executing multiple types of functions such as a printing function and a scanning function. Exchange of data (such as image data, print condition data, control data, status request data, and status data) is made possible for the multiple functions via a communications medium such as the internal bus 100.

Numeral 101 indicates a job transceiving section, which carries out transceiving of all jobs exchanged between a computer, devices, a print system, and the MFP. Types of jobs include an in-execution job, which is undergoing execution of a process such as print processing, a standby job for which a print request has been made and is standing by for commencement of processing, a completed job for which output processing has been finished, and an error job in which an error has occurred. Furthermore, jobs include various jobs having various statuses targeted for processing in the present system.

Numeral 102 indicates a job ticket parser, which performs XML parsing on job tickets described in XML and carries out structural analysis such as extraction of elements and attributes and the like, and analysis of inclusive relationships in creating tree structures. Numeral 103 indicates a job ticket interpreting section, which carries out semantic interpretation of processing instructions from the elements and attributes and moreover from structural inclusive relationships after the job ticket has been structurally analyzed.

Numeral 104 indicates an MFP management section, which carries out integrated management including handling the multiple functions with which the MFP is equipped, and associating the functions and the job ticket instructions. Numeral 105 indicates a job management section, which performs management such as saving the files of job tickets and retrieving saved jobs as well as determining job completion.

Numeral 106 indicates a scanning section, which scans originals then carries out conversion to and output of digital data. Numeral 107 indicates a PDL (page description language) interpreter, which interprets page description data. Numeral 108 indicates a RIP (raster image processor) section, which generates rasterized page data using a result of interpreting by the PDL interpreter 107.

Numeral 109 indicates a file storage management section, which stores job tickets and PDL data in an internal storage of the MFP. Numeral 110 indicates a substitute job ticket generating section, which generates substitute job tickets for the MFP to run instead of each of the original job tickets and for collecting and transferring instructions to post-processing devices. Numeral 111 indicates a digital printing section that carries out printing processes.

Figure 15:
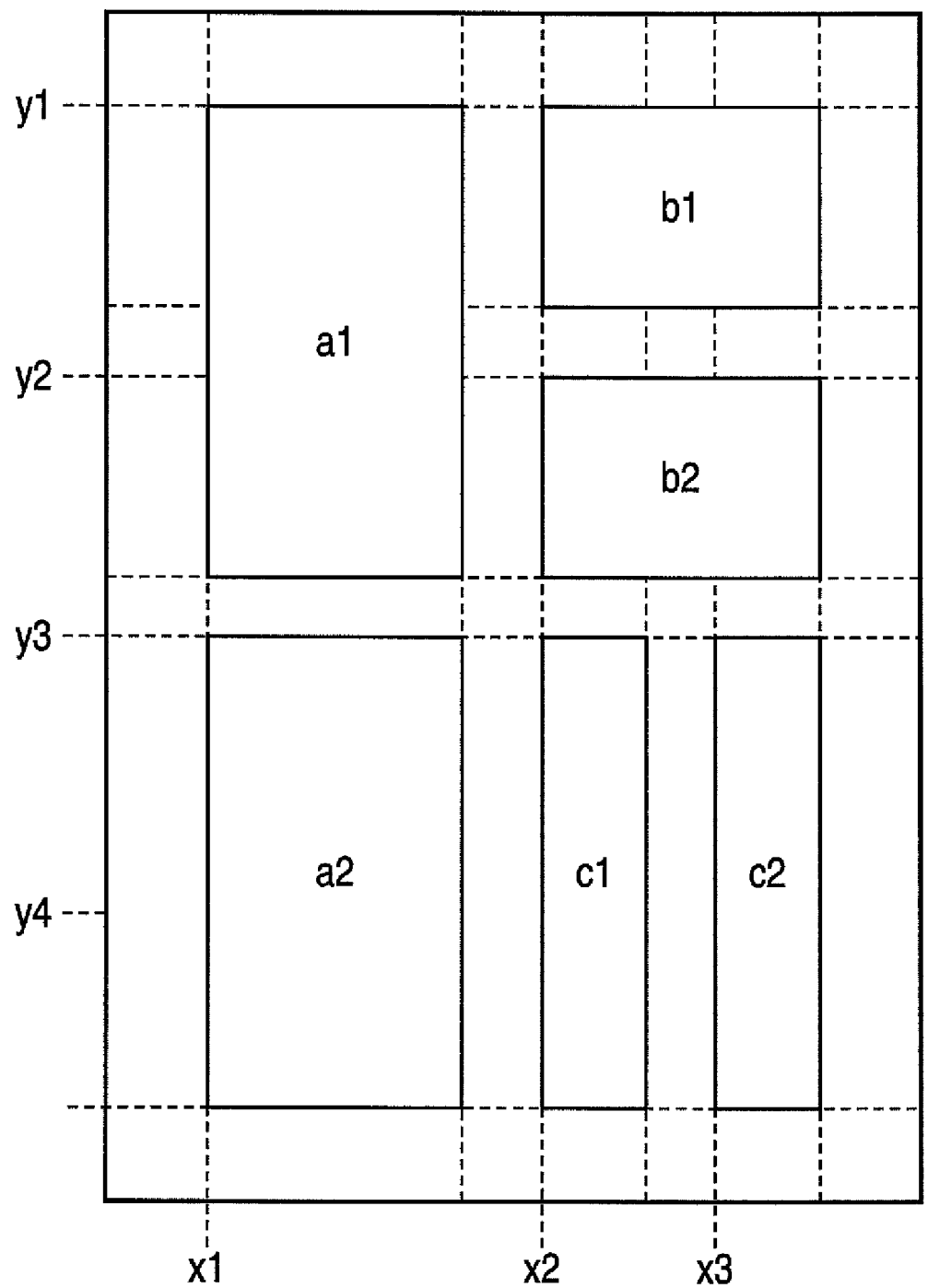
FIG. 15 shows one example of a cutting mask sheet for masking areas where cutting is prohibited and distinguishing the areas from areas where cutting is possible.

Numeral 112 indicates an imposition layout resetting section, which applies new imposition settings to the substitute job tickets. Numeral 113 indicates a cutting mask sheet data generating section, which generates cutting mask sheet data in order to generate cutting mask sheets from the substitute job tickets generated by the substitute job ticket generating section 110. A cutting mask sheet is a sheet for masking areas where cutting is prohibited and distinguishing the areas from areas where cutting is possible (see FIG. 15). It should be noted that detailed description of the cutting mask sheets is given later.

Numeral 114 indicates a page content data association resetting section, which reassociates the page content data (PDL) of each original job, on which the newly imposed content of the substitute job tickets is based. Numeral 115 indicates a cutting mask sheet insertion print setting section, which performs settings in the substitute job tickets of instructions for printing with insertions of cutting mask sheets. Numeral 116 indicates a cutting mask sheet insertion print management section, which manages insertions of cutting mask sheets and selection of output bins of output destinations and the like. Numeral 117 indicates a sheet cutting device information management section, which manages sheet cutting device information.

Figure 2:
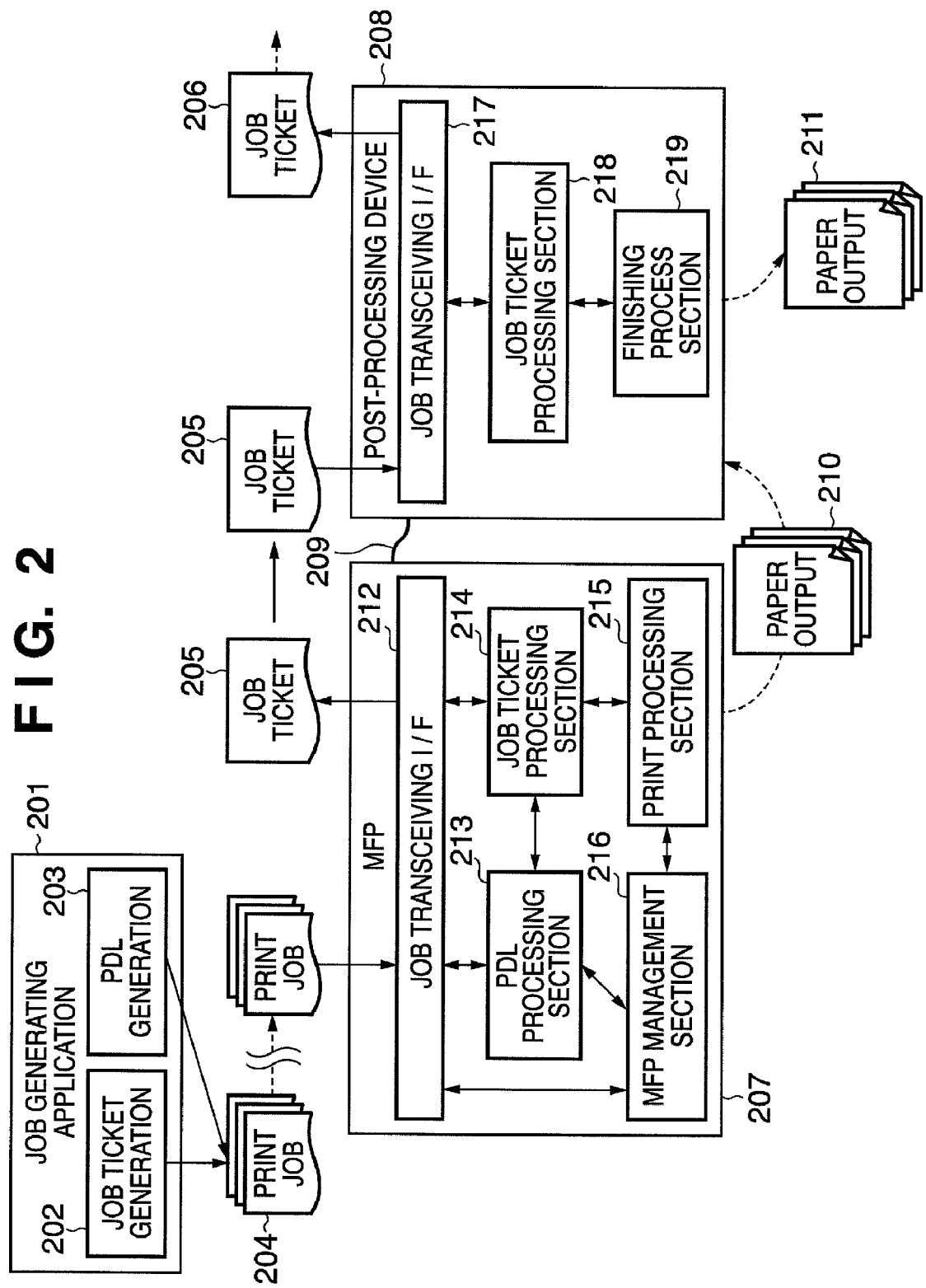
FIG. 2 is a schematic drawing showing one example of a print system including an MFP according to the first embodiment.

FIG. 2 is a schematic drawing showing one example of a print system including an MFP according to the first embodiment. The print system shown in FIG. 2 is constituted by a job generating application 201, an MFP 207, and a sheet cutting device 208 as a post-processing device. Here the job generating application 201 includes the job ticket generating section 202 and the PDL generating section 203, and generates print jobs 204 to distribute to the MFP 207.

On the other hand, the MFP 207 includes a job transceiving I/F 212 (which corresponds to the job transceiving section 101 shown in FIG. 1) that internally receives the print jobs 204 and sends job tickets. Furthermore, the MFP 207 includes a PDL processing section 213 that carries out PDL related processing, a job ticket processing section 214 that carries out job ticket related processing, a print processing section 215 that carries out print processing, and an MFP management section 216 that performs central management of the multiple functions of the MFP 207.

Moreover, the MFP 207 cooperates on a network 209 with the sheet cutting device 208. The sheet cutting device 208 includes a job transceiving I/F 217 that receives the job ticket 205 and sends a job ticket 206, a job ticket processing section 218 that carries out job ticket related processing, and a finishing process section 219 that carries out post-processing. Then, job tickets 205 are output from the MFP 207 to the sheet cutting device 208 and inputted online to the transceiving I/F 217. Furthermore, paper output 210 that has undergone print processing by the print processing section 215 is carried by an operator to the sheet cutting device 208. Then, paper output 211 that has undergone sheet cutting processing by the finishing process section 219 is output.

Next, a description is given of a process in which the MFP 207 receives and processes multiple jobs and sends substitute job tickets to the sheet cutting device 208.

Figure 3:
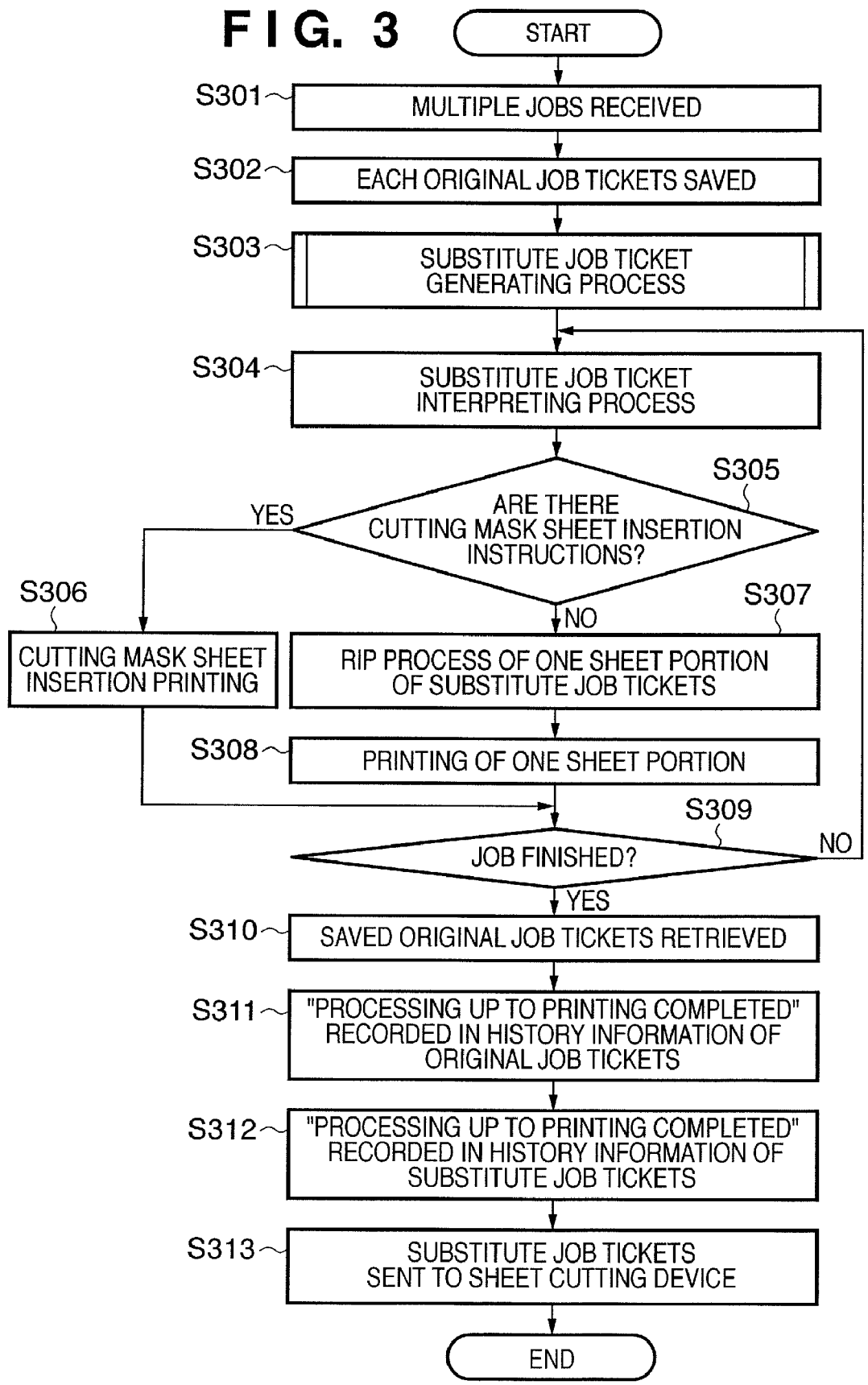
FIG. 3 is a flowchart showing a substitute job ticket sending process according to the first embodiment.

FIG. 3 is a flowchart showing a substitute job ticket sending process according to the first embodiment. First, in step S301, the job transceiving section 101 of the MFP 207 receives multiple print jobs 204. Then, in step S302, the job management section 105 stores each original job ticket in the file storage management section 109.

Next, in step S303, the substitute job ticket generating section 110 of the MFP 207 generates substitute job tickets (see FIGS. 16A to 19B) for the MFP to execute instead of each of the original job tickets and for collecting and transferring instructions to the post-processing device (i.e., the sheet cutting device 208). Then the imposition layout resetting section 112 performs new imposition settings for the substitute job tickets and the cutting mask sheet data generating section 113 generates cutting mask sheet data for generating cutting mask sheets from the substitute job tickets. Further still, the page content data association resetting section 114 resets the associations with the PDL data, which is the page content.

Here, description is given concerning details of the substitute job ticket generating process (S303) by which the substitute job ticket generating section 110 generates substitute job tickets.

Figure 4:
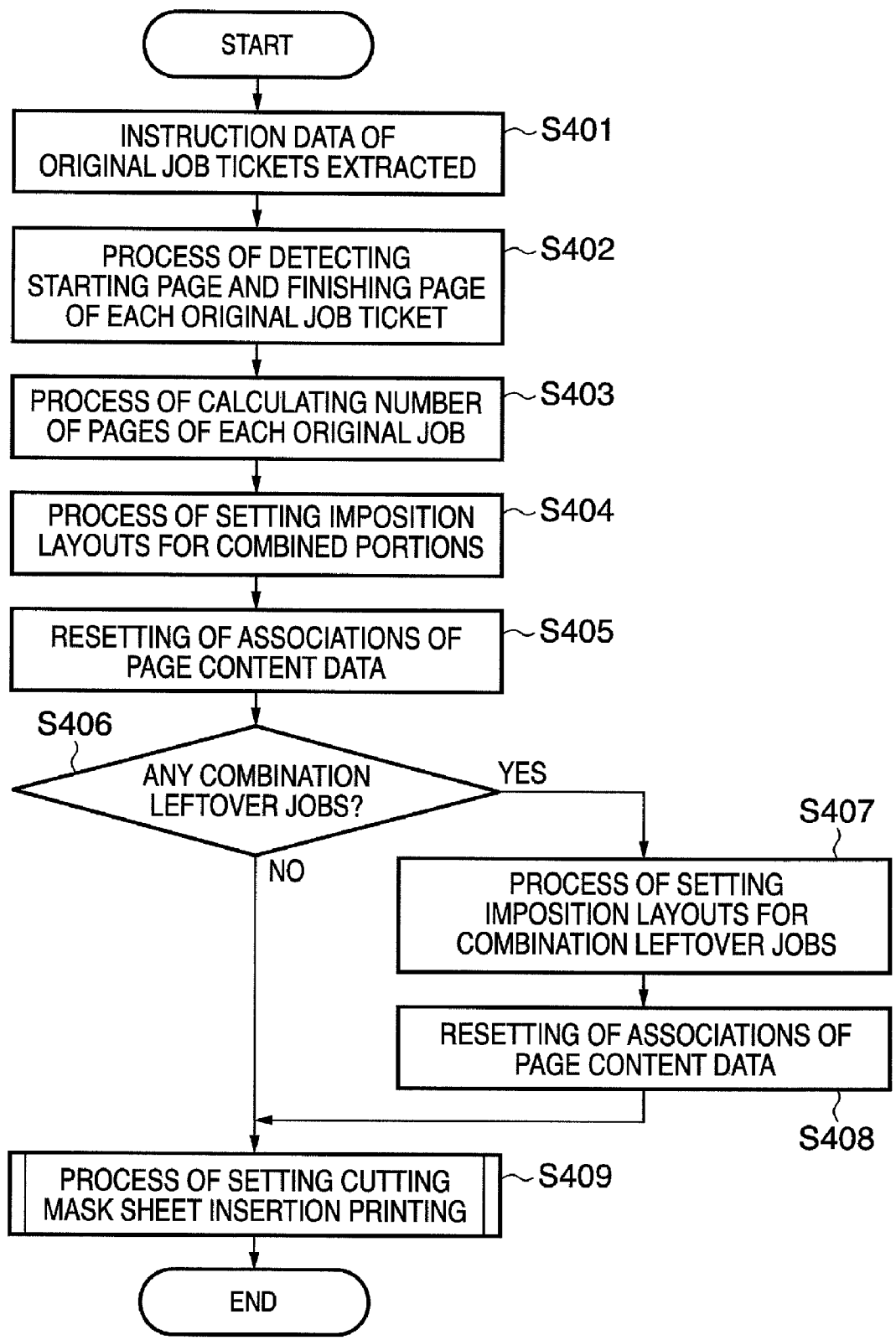
FIG. 4 is a flowchart showing the substitute job ticket generating process (S303) shown in FIG. 3.

FIG. 4 is a flowchart showing the substitute job ticket generating process (S303) shown in FIG. 3. First, in step S401, the substitute job ticket generating section 110 extracts instruction data from each original job ticket and, in step S402, in which the starting page and the finishing page of each original job is detected from the extracted instruction data. Then, in step S403, the number of pages in each original job is calculated from the detected starting pages and finishing pages. Then, in step S404, the imposition layout resetting section 112 determines imposition layouts for each sheet to be printed in the substitute job tickets from the calculated number of pages of each original job and the instruction data extracted from the original job tickets. And at the same time, new imposition layout data is set in the substitute job tickets.

Next, in step S405, the page content data association resetting section 114 sets associations between the contents that constitute each sheet to be printed in the substitute job tickets and the page data (PDL). Then, in step S406, the substitute job ticket generating section 110 uses page information that is used when combining jobs to investigate whether or not there is a job having a page to be printed that has not been used in the combined areas. Hereinafter, jobs having pages left over from combining are referred to as "combination leftover jobs."

If there is no combination leftover job as a result of the investigation, then the procedure proceeds to step S409. Otherwise, if there is a combination leftover job, then the procedure proceeds to step S407. In step S407, a process of setting an imposition layout for the combination leftover jobs is carried out for the combination leftover job portions to be added to the printing instructions of the substitute job tickets. Specifically, the imposition layout resetting section 112 determines an imposition layout for the combination leftover job portions from the number of pages of already calculated original jobs and instruction data in the original job tickets, and sets imposition layout data in the substitute job tickets. Then, in step S408, the page content data association resetting section 114 sets associations between the contents that constitute each sheet to be printed in the substitute job tickets and the page data (PDL).

Next, in step S409, the cutting mask sheet insertion print setting section 115 sets an insertion timing for cutting mask sheet insertion printing according to the substitute job tickets.

FIGS. 16A to 17B show one example of a substitute job ticket according to a first embodiment. In this example jobs A, B, and C are jobs for printing 1,000 pages, 100 pages, and 10 pages respectively, and this is an example of a substitute job ticket 1601 when combining has been carried out from page 801 onward of job A. Furthermore, a place in which there is a change in the layout of the sheet is set as an insertion timing for cutting mask sheet insertion printing.

Numeral 1602 indicates a sheet where the layout settings begin for only the original job A. Furthermore, numeral 1603 indicates a sheet where a combined layout begins for the original job A, the original job B, and the original job C. Similarly, numeral 1604 indicates a sheet where a combined layout begins for the original job A and the original job B, and numeral 1605 indicates a sheet where the layout settings begin for only the original job A.

FIGS. 18A and 19B show one example of another substitute job ticket according to the first embodiment. In this example jobs A, B, and C are jobs for printing 2,000 pages respectively, and this is an example of a substitute job ticket 1801 when combining has been carried out from the first page. Furthermore, the insertion timing for cutting mask sheet insertion printing is set giving consideration to sheet number limitations of the sheet cutting device as well as giving consideration to the number of cutting mask sheets.

In FIGS. 18A to 18C, numeral 1802 indicates a sheet where a combined layout begins for the original job A, the original job B, and the original job C. Furthermore, numerals 1803 and 1804 indicate sheets exceeding a limitation of a number of sheets of the sheet cutting device (500 sheets) (which includes cutting mask sheets).

Here, a description is given concerning details of a cutting mask sheet insertion print setting process (S409) in which the cutting mask sheet insertion print setting section 115 sets an insertion timing for cutting mask sheet insertion printing.

Figure 5:
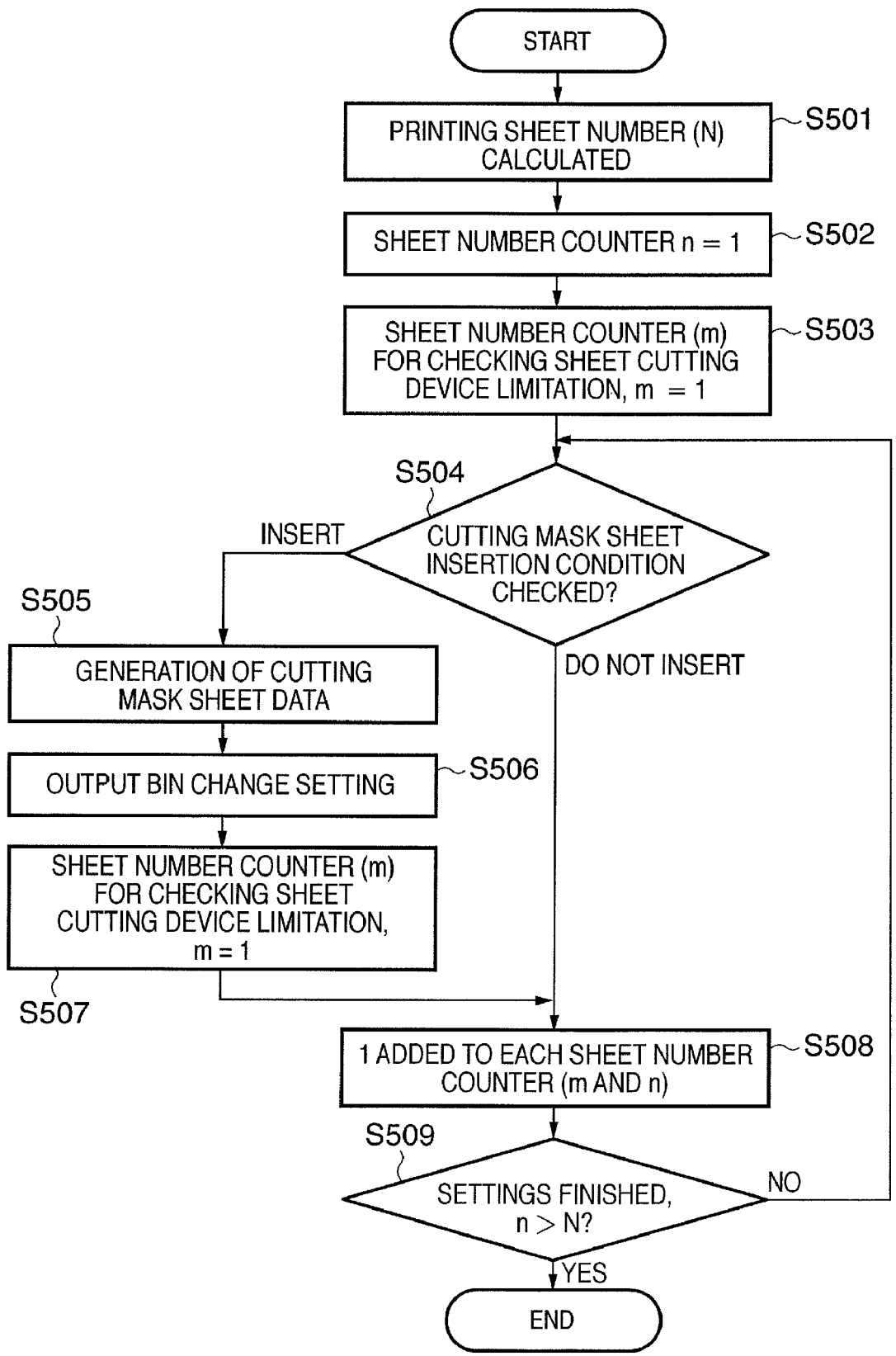
FIG. 5 is a flowchart showing the cutting mask sheet insertion print setting process (S409) shown in FIG. 4.

FIG. 5 is a flowchart showing the cutting mask sheet insertion print setting process (S409) shown in FIG. 4. First, in step S501, the cutting mask sheet insertion print setting section 115 calculates a printing sheet number (N) of the substitute job tickets including the new imposition layout settings set by the imposition layout resetting section 112. Next, in step S502, a sheet number counter (n) in the sheet processing for the substitute job tickets is initialized to "1." Then, in step S503, a sheet number counter (m) for checking whether or not the counted sheet number is within the limitation sheet number of the sheet cutting device is initialized to "1."

Next, in step S504, insertion conditions of the cutting mask sheet in each sheet of the substitute job tickets is checked. In the first embodiment, the cutting mask sheet is inserted if any one of the following conditions is satisfied.

Figure 11:
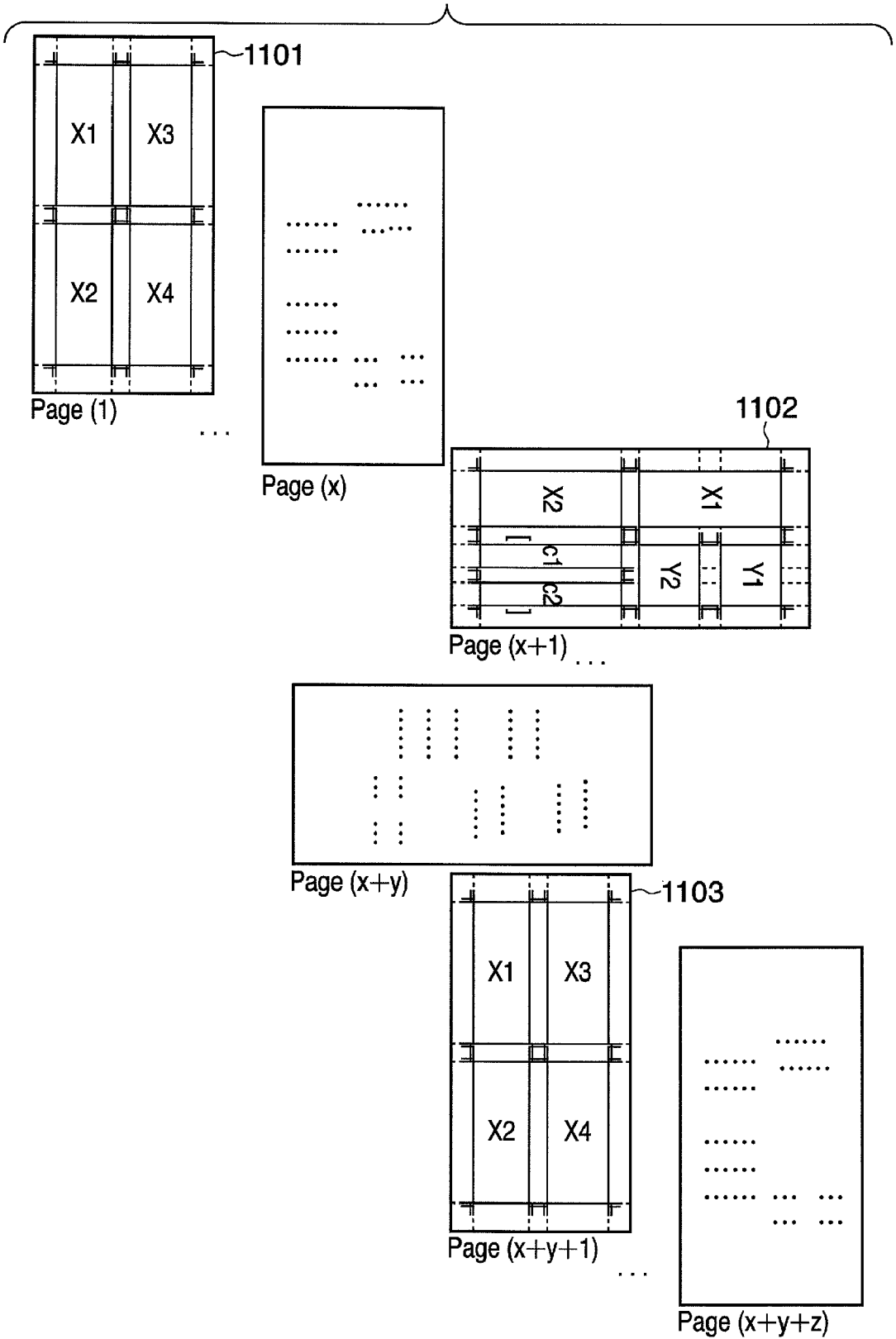
FIG. 11 shows one example of an output result when there is a change in the imposition layout of the sheet due to new imposition settings by the imposition layout resetting section 112 with a cutting mask sheet insertion condition.
Figure 12:
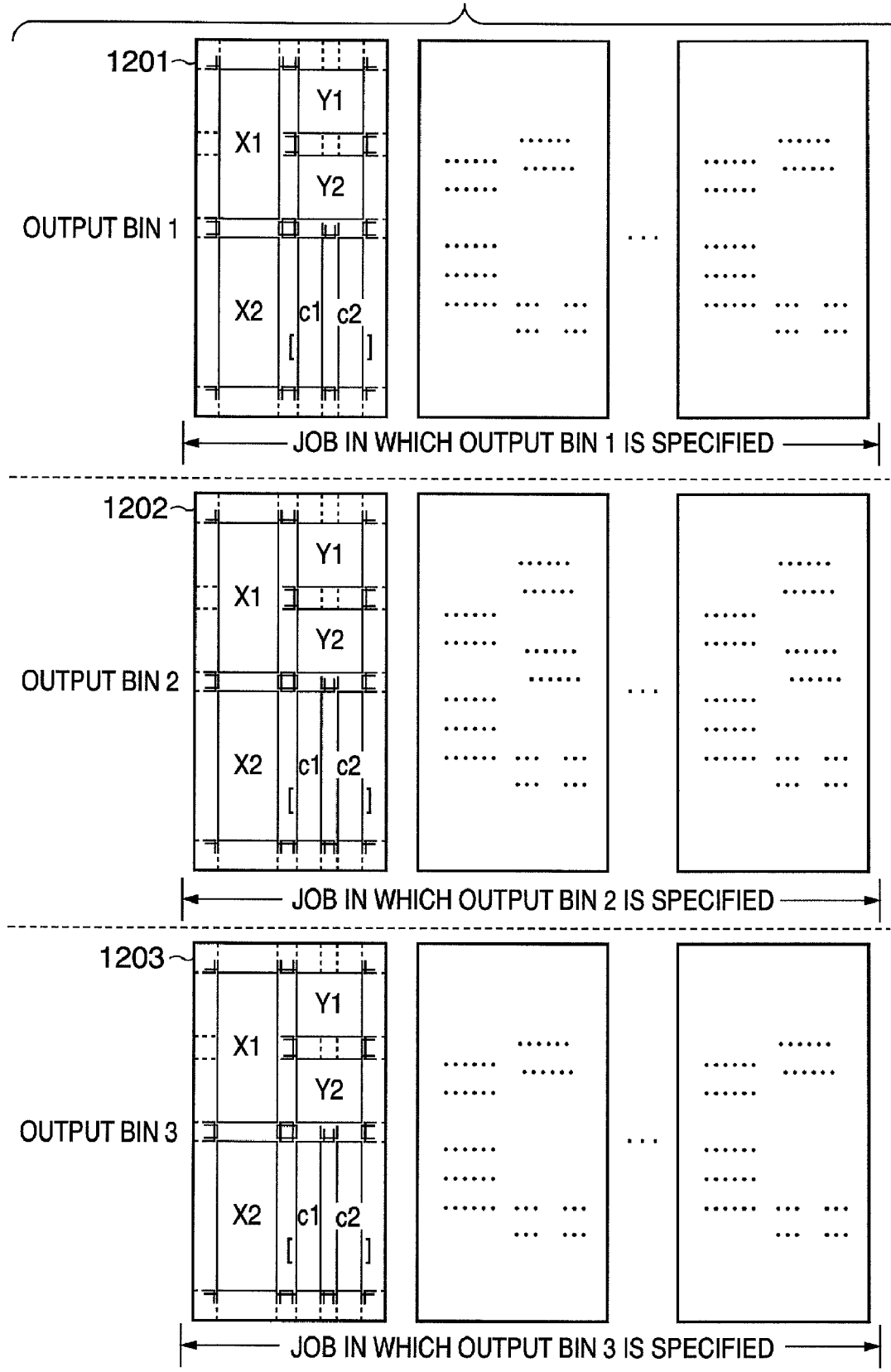
FIG. 12 shows one example of an output result when the instruction for a change in output bin is given in advance in a job ticket with a cutting mask sheet insertion condition and the output bin is to be changed even though there are no new imposition settings by the imposition layout resetting section 112.

(1) When there is a change in the imposition layout of the sheet due to new imposition settings by the imposition layout resetting section 112 (FIG. 11 and FIG. 12).

Figure 13:
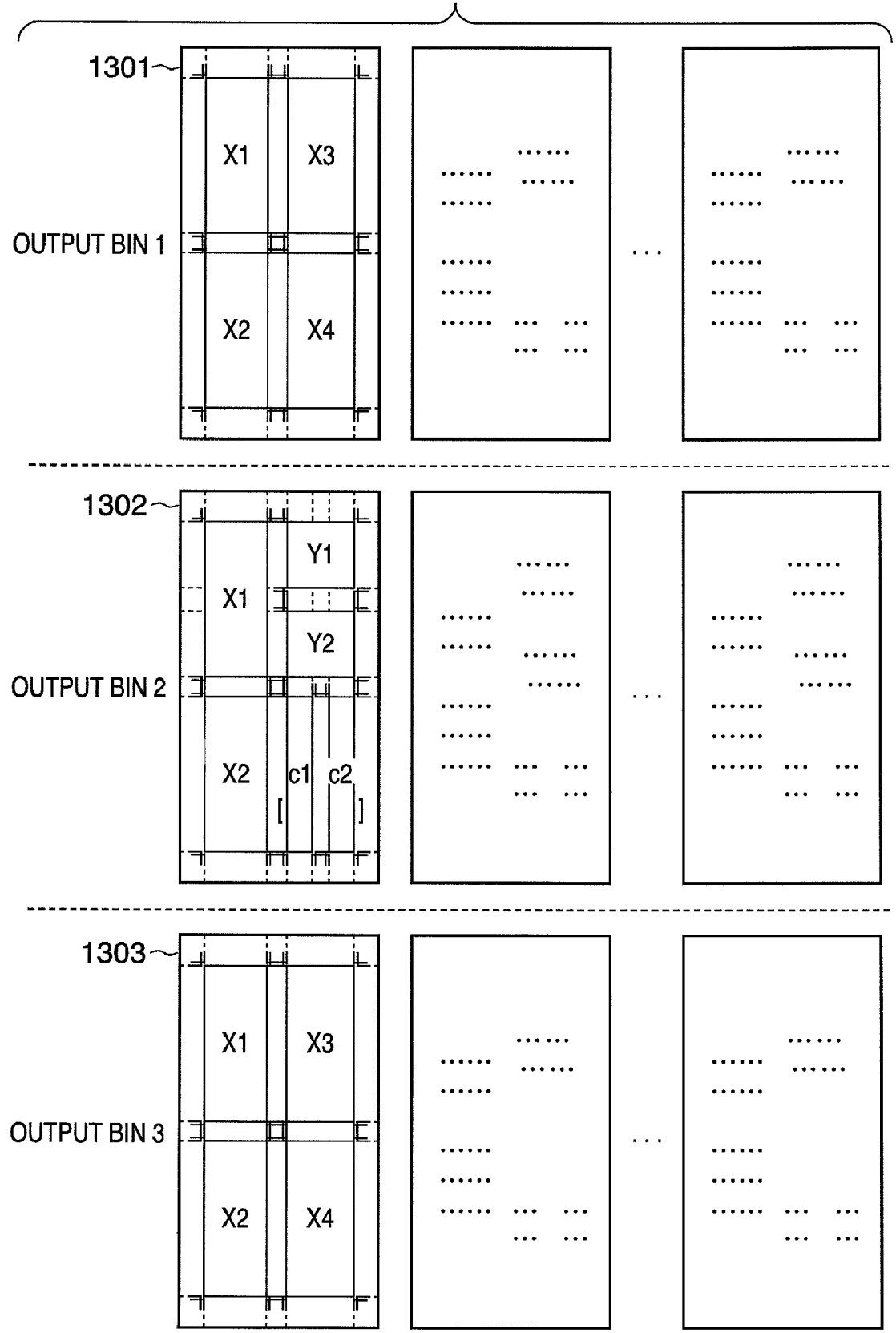
FIG. 13 shows one example of an output result involving a change in output bin when the imposition layout has been changed due to new imposition settings by the imposition layout resetting section 112 even though the instruction for a change in output bin is not given in advance in the job ticket with a cutting mask sheet insertion condition.

(2) When there is a change in the output bin even if new imposition settings have not been made by the imposition layout resetting section 112 (FIG. 13).

Figure 14:
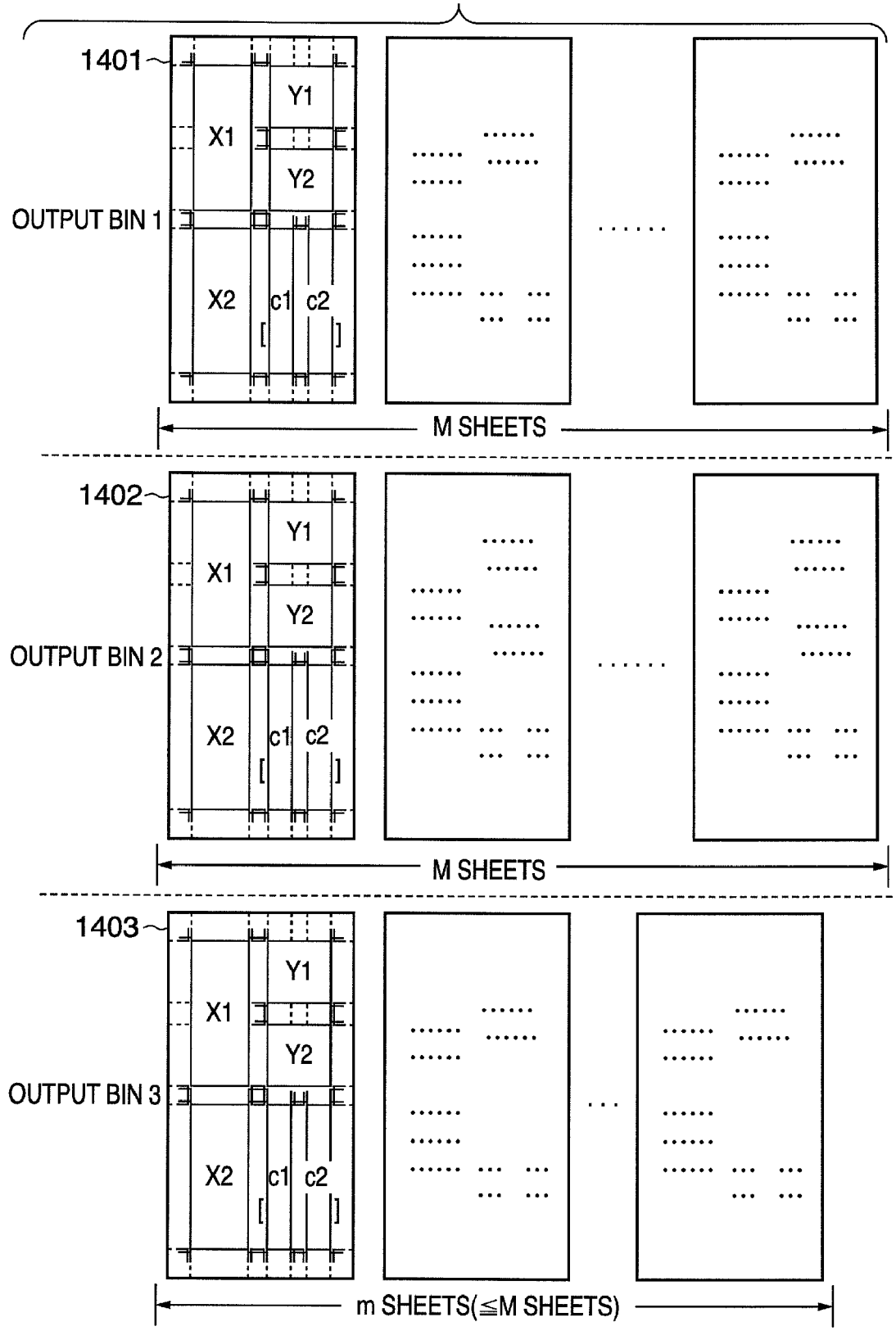
FIG. 14 shows one example of an output result when the number of printing sheets exceeds the limitation of the sheet cutting device even though new imposition settings have not been made by the imposition layout resetting section 112 with a cutting mask sheet insertion condition.

(3) When the printing sheet number exceeds the limitation of the sheet cutting device even if new imposition settings have not been made by the imposition layout resetting section 112 (FIG. 14).

That is to say, in respect to a limitation sheet number M of the sheet cutting device, a case in which m (the count corresponding to the next sheet) is greater than M is set as an insertion condition of the cutting mask sheet.

Figure 10:
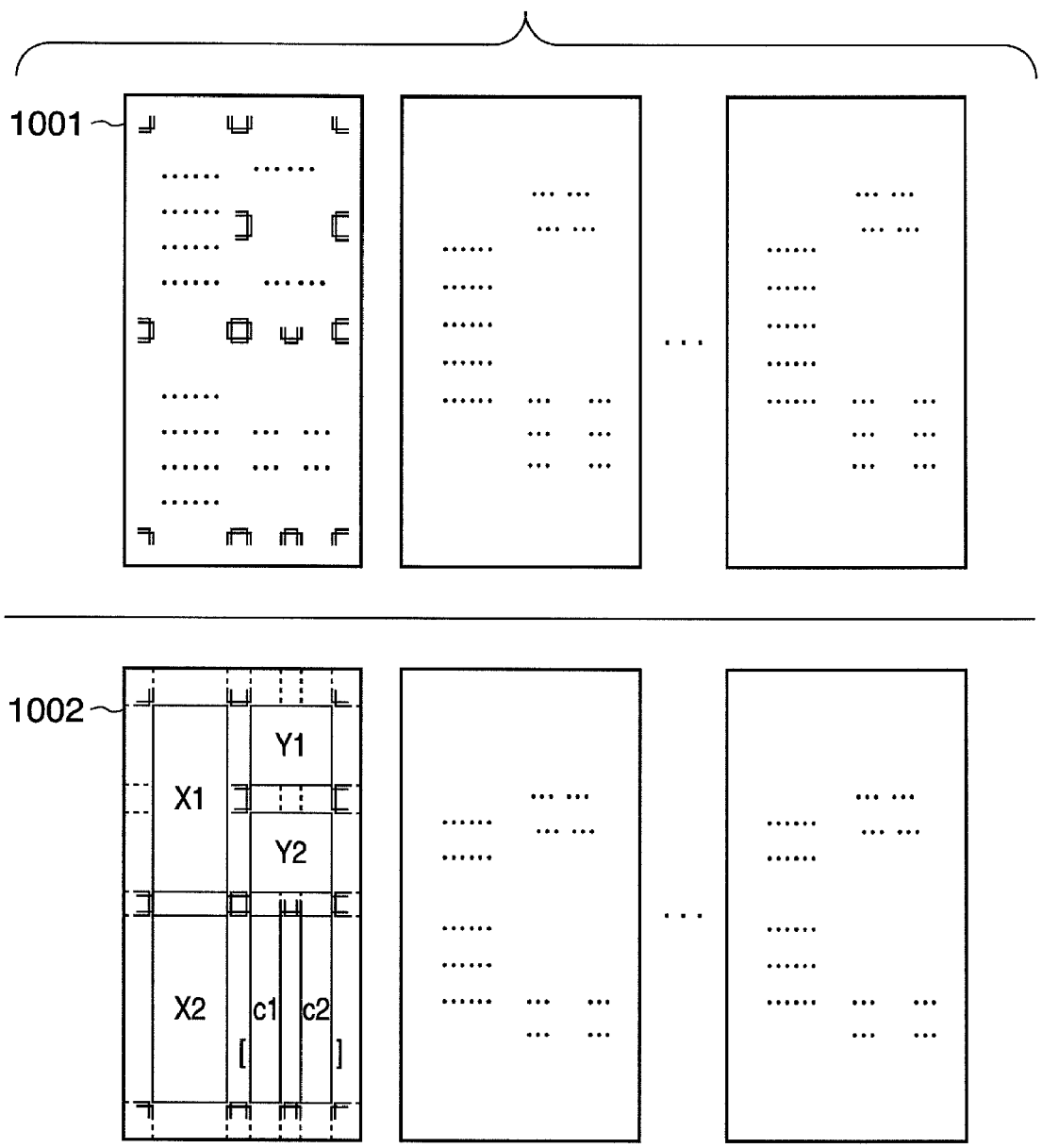
FIG. 10 shows a case in which conventional technology cutting marks are used and a case in which a cutting mask sheet (paper on which printing is carried out distinguishing areas where cutting is prohibited) is printed on a forefront of a cutting bundle.

FIG. 10 shows a case in which cutting marks of conventional technologies are used and a case in which a cutting mask sheet (paper on which printing is carried out distinguishing areas where cutting is prohibited) is printed on a forefront of a cutting bundle. Numeral 1001 shown in FIG. 10 indicates one example of a ganged job output result when using cutting marks of conventional technologies. Numeral 1001 is an example of cutting marks such as register marks and trim mark lines being added onto a print sheet on which document pages have been laid out. When cutting marks are added onto the same print sheet as document pages in this way, the cutting marks cannot be added in a border line format of the document pages since a width for trim marks is required. Thus, as shown by numeral 1001, register marks are added on both sides of cutting.

Here, when the layout of document pages on the print sheet is simple, operators rarely make a mistake in the cutting position, but there are problems with multi-imposition printing where there are often complicated layouts such as for ganged jobs. For example, when there is a first document page arranged on a single printing sheet and arranged lined up next to this is another second document page having a shorter length, then the first document page will end up being cut if cutting processes are carried out first for the second document page. Here, when print content is printed on the entire surface of the first document page, it is possible the operator will notice this prior to cutting, but when there are many white spaces on the first document page, it can be imagined that the content of the first document page will be indistinguishable and mistakes will occur during cutting. In cases where multi-imposition printing data has complicated layouts, it was impossible to reduce mistakes during printing with conventional methods in which cutting marks were added to the same printing sheet as the document pages.

In contrast to this, numeral 1002 indicates one example of an output result for a case in which a cutting mask sheet (paper on which printing is carried out distinguishing areas where cutting is prohibited) is printed on a forefront of a cutting bundle, which is a characteristic of an embodiment of the present invention. In regard to numeral 1002, since a cutting sheet is prepared separately to the cutting bundle of printing sheets on which the document pages are laid out, cutting positions can be added in a border line format of the document pages and can be easily recognized visually. Thus, a printing sheet onto which cutting positions have been added in a border line format of the document pages is referred to as a cutting mask sheet.

FIG. 11 shows one example of an output result when there is a change in the imposition layout of the sheet due to new imposition settings by the imposition layout resetting section 112, which falls under a cutting mask sheet insertion condition. In the example shown in FIG. 11, no change is made to the output bin, instead the alignment of the output sheets is made alternately different and output. In addition, it is same meaning as cutting mask sheet and cutting sheet.

Numeral 1101 indicates one example of the cutting mask sheet created based on a sheet layout of a preceding job. Numeral 1102 indicates one example of a cutting mask sheet created by combining with an interrupt job as in a second embodiment, which is to be described later. Numeral 1103 indicates one example of a cutting mask sheet for a combination leftover job as in the second embodiment, which is to be described later.

FIG. 12 shows one example of an output result when the instruction for a change in output bin is given in advance in a job ticket and the output bin is to be changed even though there are no new imposition settings by the imposition layout resetting section 112, which falls under a cutting mask sheet insertion condition. Numeral 1201 indicates one example of the cutting mask sheet created based on a sheet layout of a job for which an output bin 1 is specified. Numeral 1202 indicates one example of the cutting mask sheet created based on a sheet layout of a job for which an output bin 2 is specified. Numeral 1203 indicates one example of the cutting mask sheet created based on a sheet layout of a job for which an output bin 3 is specified.

FIG. 13 shows one example of an output result involving a change in output bin when the imposition layout has been changed due to new imposition settings by the imposition layout resetting section 112 even though the instruction for a change in output bin is not given in advance in the job ticket, which falls under a cutting mask sheet insertion condition. Numeral 1301 indicates one example of the cutting mask sheet created based on a sheet layout of a preceding job. Numeral 1302 indicates one example of a cutting mask sheet created by combining with an interrupt job as in a second embodiment, which is to be described later. Numeral 1303 indicates one example of a cutting mask sheet for a combination leftover job as in the second embodiment.

FIG. 14 shows one example of an output result when the number of printing sheets exceeds the limitation of the sheet cutting device even though new imposition settings have not been made by the imposition layout resetting section 112, which falls under a cutting mask sheet insertion condition. Numeral 1401 indicates one example of the cutting mask sheet based on a sheet layout of a job within an initial limitation sheet number of the sheet cutting device. Numeral 1402 indicates one example of the cutting mask sheet based on a sheet layout of a next job within a limitation sheet number of the sheet cutting device. Numeral 1403 indicates one example of the cutting mask sheet based on a sheet layout of a final job within a limitation sheet number of the sheet cutting device.

Returning to FIG. 5 here, in step S504, when the cutting mask sheet insertion condition is checked and "insert" is determined, the procedure proceeds to step S505. In step S505, based on the new imposition layout of the sheet in the substitute job ticket, the cutting mask sheet data generating section 113 generates cutting mask sheet data for the combined areas that masks areas where cutting is prohibited and distinguishes the areas from areas where cutting is possible. Then, in step S506, a change in output bin is set in the substitute job ticket even when no change in output bin has been specified in advance in the job ticket. In an embodiment, when a change in output bin has been specified in advance in the job ticket, a change in output bin is not made again.

Next, in step S507, the timing for cutting with the sheet cutting device changes due to the change in output bin, and therefore the sheet number counter (m) for checking the sheet cutting device limitation is again reinitialized to "1." Then, in step S508, one is added to each of the sheet number counters (m and n).

Next, in step S509, if the sheet number counter (n) of the substitute job ticket in regard to the printing sheet number (N) of the substitute job ticket is not n>N, then the procedure returns to step S504 and the cutting mask sheet insertion condition is checked for the next sheet. Furthermore, if n>N for the sheet number counter (n) of the substitute job ticket, then there is no next sheet and therefore this process finishes. This completes the substitute job ticket generation process (S401 to S409) shown in FIG. 4 and the process return to FIG. 3.

In step S304, the job ticket parser 102 and the job ticket interpreting section 103 perform XML parsing on the substitute job tickets described in XML and carry out structural analysis such as extraction of elements and attributes and the like, and analysis of inclusive relationships in creating tree structures. And at the same time, semantic interpretation of processing instructions is carried out from each element and attribute and moreover from structural inclusions and then extracted as instruction information to the MFP 207.

Next, in step S305, it is determined whether or not insertion instructions of cutting mask sheet data are present in the instruction information to the MFP 207. If there are no insertion instructions, then the procedure proceeds to step S307 and the PDL interpreter 107 and the RIP section 108 carry out RIP process of one sheet portion according to imposition layout instructions of the substitute job ticket and generate one sheet portion of print image data. Then, in step S308, the digital printing section 111 carries out printing of one sheet portion.

Furthermore, in step S305, when insertion instructions of cutting mask sheet data are present in the instruction information to the MFP 207, the procedure proceeds to step S306. In step S306, the digital printing section 111 inserts and prints as print data the cutting mask sheet data in accordance with the instructions for cutting mask sheet insertion printing described in the substitute job ticket.

Next, instep S309, the job management section 105 determines whether or not the job of the substitute job ticket has finished. Here, when this is not finished, the procedure returns to step S304 and the substitute job ticket interpreting process is carried out for print processing of the next sheet.

On the other hand, when the job of the substitute job ticket has finished, the procedure proceeds to step S310 and the job management section 105 retrieves the original job tickets that have been saved. Then, in step S311, statuses to the effect that "processing up to printing has been completed" are recorded in history storage areas for each original job ticket respectively. Then, in step S312, statuses to the effect that "processing up to printing has been completed" are recorded in history storage areas of the actual substitute job tickets as well.

Next, in step S313, the job management section 105 sends the substitute job tickets from the job transceiving section 101 to the sheet cutting device 208 as job tickets 205.

As described above, even in cases of printed materials that have many white spaces in complicated cutting layouts for ganged jobs, it is possible to reduce cutting operator mistakes and improve processing efficiency by generating substitute job tickets and carrying out insertion printing with cutting mask sheets.

Second Embodiment

Next, detailed description is given concerning a second embodiment of the present invention with reference to the accompanying drawings. With the second embodiment, description is given of a case in which the MFP receives an interrupt job while conducting printing, and generates a ganged job by combining this with the preceding job.

It should be noted that the configurations of the MFP and the print system in the second embodiment are the same as the first embodiment, which was described using FIGS. 1 and 2, and description thereof is omitted.

Figure 6:
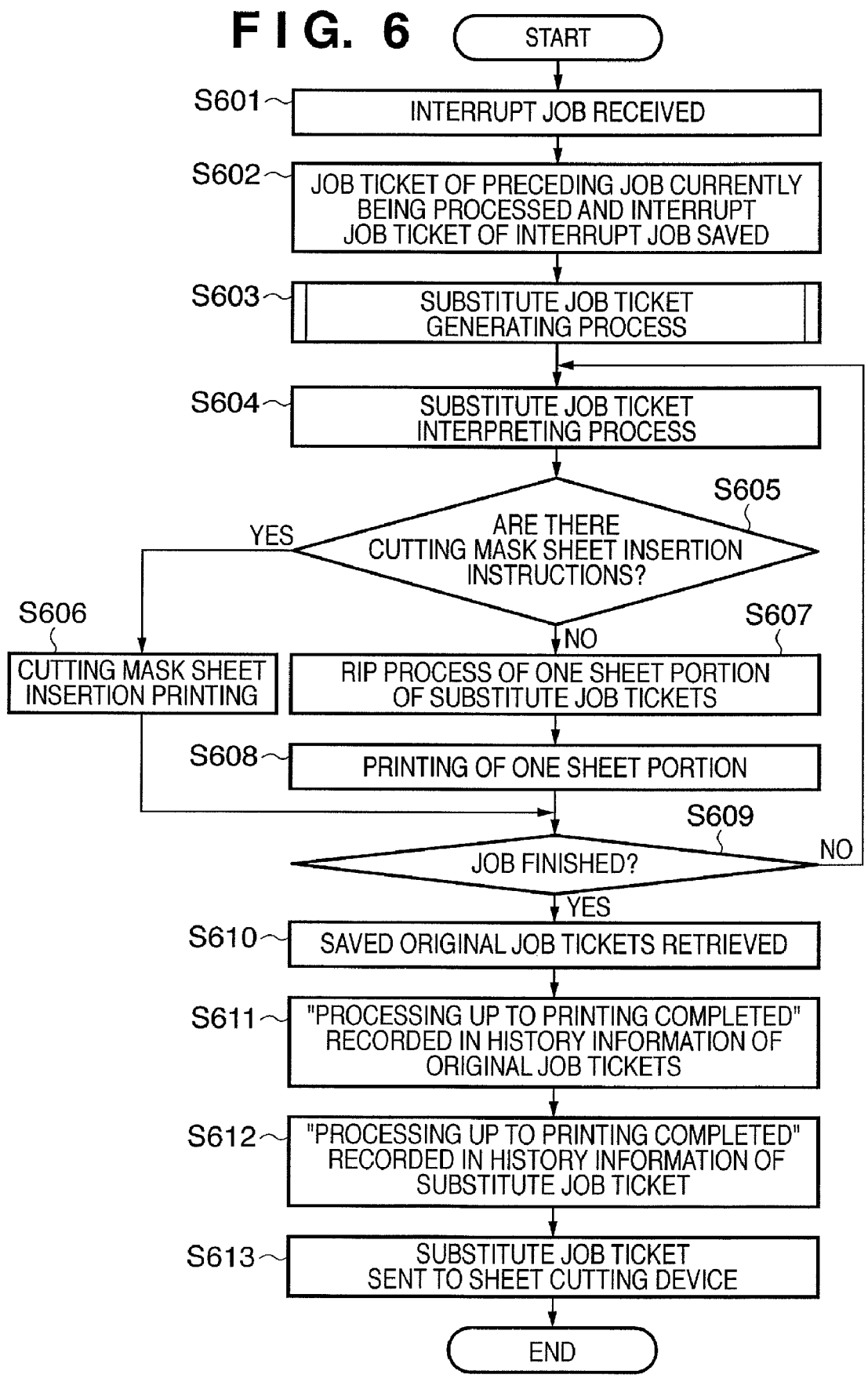
FIG. 6 is a flowchart showing a substitute job ticket sending process according to a second embodiment.

FIG. 6 is a flowchart showing a substitute job ticket sending process according to a second embodiment. First, at step S601, the job transceiving section 101 of the MFP 207 receives an interrupt job 204. Then, at step S602, the job management section 105 saves the job ticket of the preceding job currently being processed and the job ticket of the interrupt job into the file storage management section 109.

Next, at step S603, the substitute job ticket generating section 110 of the MFP 207 generates substitute job tickets for the MFP to run instead of the job tickets of the preceding job and the interrupt job and for collecting and transferring instructions to the post-processing device (i.e., the sheet cutting device 208). Then the imposition layout resetting section 112 performs new imposition settings for the substitute job tickets and the cutting mask sheet data generating section 113 generates cutting mask sheet data for generating cutting mask sheets from the substitute job tickets. Further still, the page content data association resetting section 114 resets the associations with the PDL data, which is the page content.

Here, description is given concerning details of the substitute job ticket generating process (S603) by which the substitute job ticket generating section 110 generates substitute job tickets.

FIG. 7 is a flowchart showing the substitute job ticket generating process (S603) shown in FIG. 6. First, at step S701, instructions and data are extracted from instruction data of the job ticket of the preceding job and the job ticket of the interrupt job and, at step S702, the starting page and the finishing page of an unprocessed portion of the preceding job is detected from the extracted instruction data. Then, at step S703, the number of pages in the unprocessed portion of the preceding job is calculated from the detected starting page and finishing page of the unprocessed portion of the preceding job. Then, at step S704, the starting page and finishing page of the interrupt job are detected and, at step S705, the number of pages in the interrupt job is calculated from the detected starting page and finishing page of the interrupt job.

Next, at step S706, the imposition layout resetting section 112 determines imposition layouts for each sheet to be printed in the substitute job tickets from the calculated number of pages of each job and the instruction data extracted from the original job tickets. And at the same time, new imposition layout data is set in the substitute job tickets. At this time, in regard also to sheets of the preceding job that have been printed, settings are left in the substitute job tickets as processed instructions.

Next, at step S707, the page content data association resetting section 114 sets associations between the contents that constitute each sheet to be printed in the substitute job tickets and the page data (PDL). Then, at step S708, the substitute job ticket generating section 110 uses page information used when combining the interrupt job into the preceding job to investigate whether or not there is a combination leftover job, excluding pages in the preceding job that have been printed.

If there is no combination leftover job as a result of the investigation, then the procedure proceeds to step S711, but if there is a combination leftover job, then the procedure proceeds to step S709. At step S709, a process of setting an imposition layout for the combination leftover jobs is carried out for the combination leftover job portions to be added to the printing instructions of the substitute job tickets. Specifically, the imposition layout resetting section 112 determines an imposition layout for the combination leftover job portions from the number of pages of already calculated original jobs and instruction data in the original job tickets, and sets imposition layout data in the substitute job tickets. Then, at step S710, the page content data association resetting section 114 sets associations between the contents that constitute each sheet to be printed in the substitute job tickets and the page data (PDL).

Next, at step S711, the cutting mask sheet insertion print setting section 115 sets an insertion timing for cutting mask sheet insertion printing for printing according to the substitute job tickets. It should be noted that the process of setting cutting mask sheet insertion printing carried out by the cutting mask sheet insertion print setting section 115 is the same as the first embodiment, which was described using FIG. 5, and description thereof is omitted.

Here, the substitute job ticket generation process shown in FIG. 7 is finished, and we return to FIG. 6.

At step S604, the job ticket parser 102 and the job ticket interpreting section 103 perform XML parsing on the substitute job tickets described in XML and carry out structural analysis such as extraction of elements and attributes and the like, and analysis of inclusive relationships in creating tree structures. And at the same time, semantic interpretation of processing instructions is carried out from each element and attribute and moreover from structural inclusions and then extracted as instruction information to the MFP 207.

Next, at step S605, a check is carried out as to whether or not insertion instructions of cutting mask sheet data are present in the instruction information to the MFP 207. If there are no insertion instructions, then the procedure proceeds to step S607 and the PDL interpreter 107 and the RIP section 108 carry out RIP process of one sheet portion according to imposition layout instructions of the substitute job ticket and generate one sheet portion of print image data. Then, at step S608, the digital printing section 111 carries out printing of one sheet portion.

On the other hand, when insertion instructions of cutting mask sheet data are present in the instruction information to the MFP 207 at step S605, the procedure proceeds to step S606. At step S606, the digital printing section 111 inserts and prints as print data the cutting mask sheet data in accordance with the instructions for cutting mask sheet insertion printing described in the substitute job ticket.

Next, at step S609, the job management section 105 determines whether or not the job of the substitute job ticket has finished. Here, when this is not finished, the procedure returns to step S604 and the substitute job ticket interpreting process is carried out for print processing of the next sheet.

On the other hand, when the job of the substitute job ticket has finished, the procedure proceeds to step S610 and the job management section 105 retrieves the job tickets of the preceding job ticket and the interrupt job ticket, which had been saved. Then, at step S611, statuses to the effect that "processing up to printing has been completed" are recorded in history storage areas for each job ticket respectively. Then, at step S612, statuses to the effect that "processing up to printing has been completed" are recorded also in history storage areas of the actual substitute job tickets.

Next, at step S613, the job management section 105 sends the substitute job tickets from the job transceiving section 101 to the sheet cutting device 208 as job tickets 205.

As described above, even in cases where an interrupt job is received while conducting printing and a ganged job is generated by combining this with the preceding job, substitute job tickets are generated and cutting mask sheets are inserted for printing. This enables cutting operator mistakes to be reduced and improves processing efficiency.

Third Embodiment

Next, detailed description is given concerning a third embodiment of the present invention with reference to the accompanying drawings. With the third embodiment, description is given of a case in which there are printing instructions for multiple numbers of copies in the preceding job or the interrupt job when the MFP receives an interrupt job while conducting printing and generates a ganged job by combining this with the preceding job.

The job management section 105 has the substitute job ticket generating section 110 generate substitute job tickets for only portions in which the preceding job and the interrupt job are combined, and substitute job tickets are sent to the sheet cutting device 208 for combined portions and the preceding job tickets are sent for the remaining number of copies.

It should be noted that the configurations of the MFP and the print system in the third embodiment are the same as the first embodiment, which was described using FIGS. 1 and 2, and description thereof is omitted.

Figure 8B:
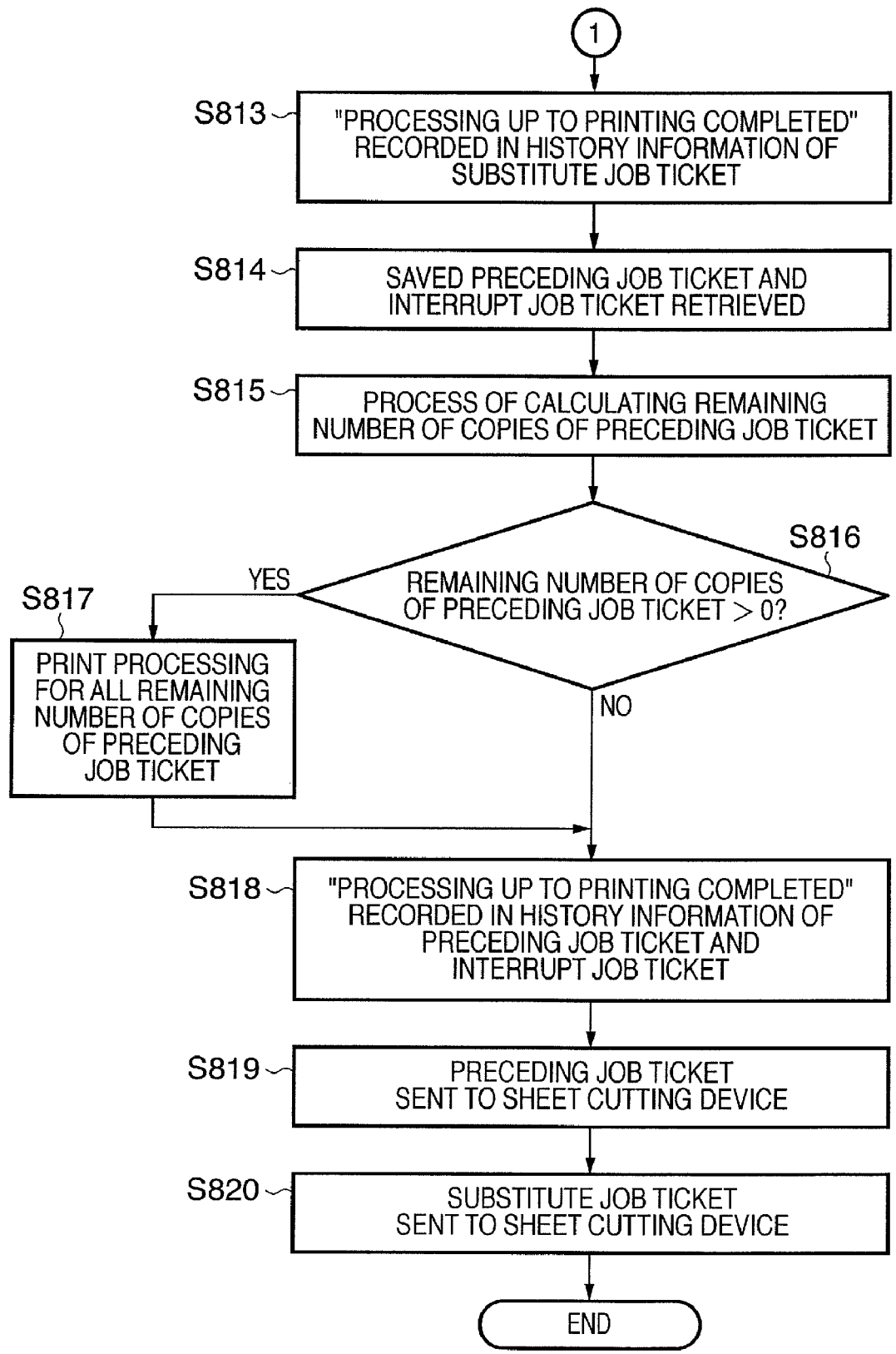

FIGS. 8A and 8B are a flowchart showing a substitute job ticket sending process according to the third embodiment. First, at step S801, the job transceiving section 101 of the MFP 207 receives an interrupt job 204. Then, at step S802, the job management section 105 saves the job ticket of the preceding job currently being processed and the job ticket of the interrupt job into the file storage management section 109.

Next, at step S803, the printing instructions for the number of copies are checked for the preceding job currently undergoing processing. Here, when the printing instructions for the number of copies of the preceding job indicate one copy, processing thereon is the same as the second embodiment, and therefore as shown in FIG. 6.

On the other hand, when the number of copies in the printing instructions of the preceding job currently being processed is two copies or more, the procedure proceeds to step S804, and a comparison is made between the remaining number of pages of the preceding job currently being processed and the number of pages of the interrupt job. When the result is that the number of pages of the interrupt job is greater than the remaining number of pages of the preceding job currently being processed, then the procedure proceeds to step S821 and the interrupt job is made to standby until processing of the next copy of the preceding job currently being processed commences. In contrast to this, when the remaining number of pages of the preceding job currently being processed is more than the number of pages of the interrupt job, then the procedure proceeds to step S805 and the preceding job currently being processed is saved in the file storage management section 109. Then, the substitute job ticket generating section 110 is made to generate substitute job tickets for only portions in which the preceding job and the interrupt job are combined.

That is, at step S806, the substitute job ticket generating section 110 generates substitute job tickets for only portions in which the preceding job and the interrupt job are combined. Then, in a same manner as the second embodiment, the imposition layouts of those portions are reset, cutting mask data is generated, and associations with PDL data, which are the page contents, are reset.

It should be noted that this is fundamentally the same substitute job ticket generating process as shown in FIG. 7 and therefore description is omitted here.

Here, when the substitute job ticket generating process is finished, at step S807, the job ticket parser 102 and the job ticket interpreting section 103 perform XML parsing on the substitute job tickets that are described in XML. Then, structural analysis is carried out such as extraction of elements and attributes and the like, as well as analysis of inclusive relationships in creating tree structures. And at the same time, semantic interpretation of processing instructions is carried out from each element and attribute and moreover from structural inclusions and then extracted as instruction information to the MFP 207.

Next, at step S808, a check is carried out as to whether or not insertion instructions of cutting mask sheet data are present in the instruction information to the MFP 207. If there are no insertion instructions, then the procedure proceeds to step S809 and the PDL interpreter 107 and the RIP section 108 carry out RIP process of one sheet portion according to imposition layout instructions of the substitute job ticket and generate one sheet portion of print image data. Then, at step S810, the digital printing section 111 carries out printing of one sheet portion.

On the other hand, at step S808, when insertion instructions of cutting mask sheet data are present in the instruction information to the MFP 207, the procedure proceeds to step S812. At step S812, the digital printing section 111 inserts and prints as print data the cutting mask sheet data in accordance with the instructions for cutting mask sheet insertion printing described in the substitute job ticket.

Next, at step S811, the job management section 105 determines whether or not the job of the substitute job ticket has finished. Here, when this is not finished, the procedure returns to step S807 and the substitute job ticket interpreting process is carried out for print processing of the next sheet.

On the other hand, when the jobs of the substitute job tickets are finished, then the procedure proceeds to step S813 and statuses to the effect that "processing up to printing has been completed" are recorded in history storage areas of the actual substitute job tickets.

Next, at step S814, the job management section 105 retrieves the job tickets of the preceding job ticket and the interrupt job ticket, which had been saved. Then, at step S815, the remaining number of copies of the preceding job ticket is calculated from the number of copies processed prior to the interrupt and the number of copies processed in the substitute job tickets.

Next, at step S816, a check is carried out as to whether or not there is any remaining number of copies in the preceding job ticket. Here, if there is no remaining number of copies in the preceding job ticket, then the procedure proceeds to step S818, but if there are remaining number of copies in the preceding job ticket, then all the remaining number of copies undergo print processing using the preceding job ticket and the procedure proceeds to step S818. At this step S818, statuses to the effect that "processing up to printing has been completed" are recorded in history storage areas for the preceding job tickets and the interrupt job tickets respectively.

Next, at step S819, the preceding job tickets are sent from the job transceiving section 101 to the sheet cutting device 208 as job tickets 205. Then, at step S820, the substitute job tickets are sent from the job transceiving section 101 to the sheet cutting device 208 as job tickets 205.

As described above, even in cases where there are printing instructions for multiple numbers of copies in the preceding job or the interrupt job, it is possible to reduce cutting operator mistakes and improve processing efficiency by generating substitute job tickets and carrying out insertion printing with cutting mask sheets.

Fourth Embodiment

Next, detailed description is given concerning a fourth embodiment of the present invention with reference to the accompanying drawings. In the fourth embodiment, all pages are handled separately by assigning IDs to pages of the number of pages remaining to be processed+pages of the remaining number of copies to be processed. Then, when there are printing instructions for a multiple number of copies in the interrupt job, substitute job tickets are generated in a format involving handling all the pages separately by assigning IDs to the pages of the number of copies to be processed in the interrupt job.

It should be noted that the configurations of the MFP and the print system in the fourth embodiment are the same as the first embodiment, which was described using FIGS. 1 and 2, and description thereof is omitted.

Figure 9A:
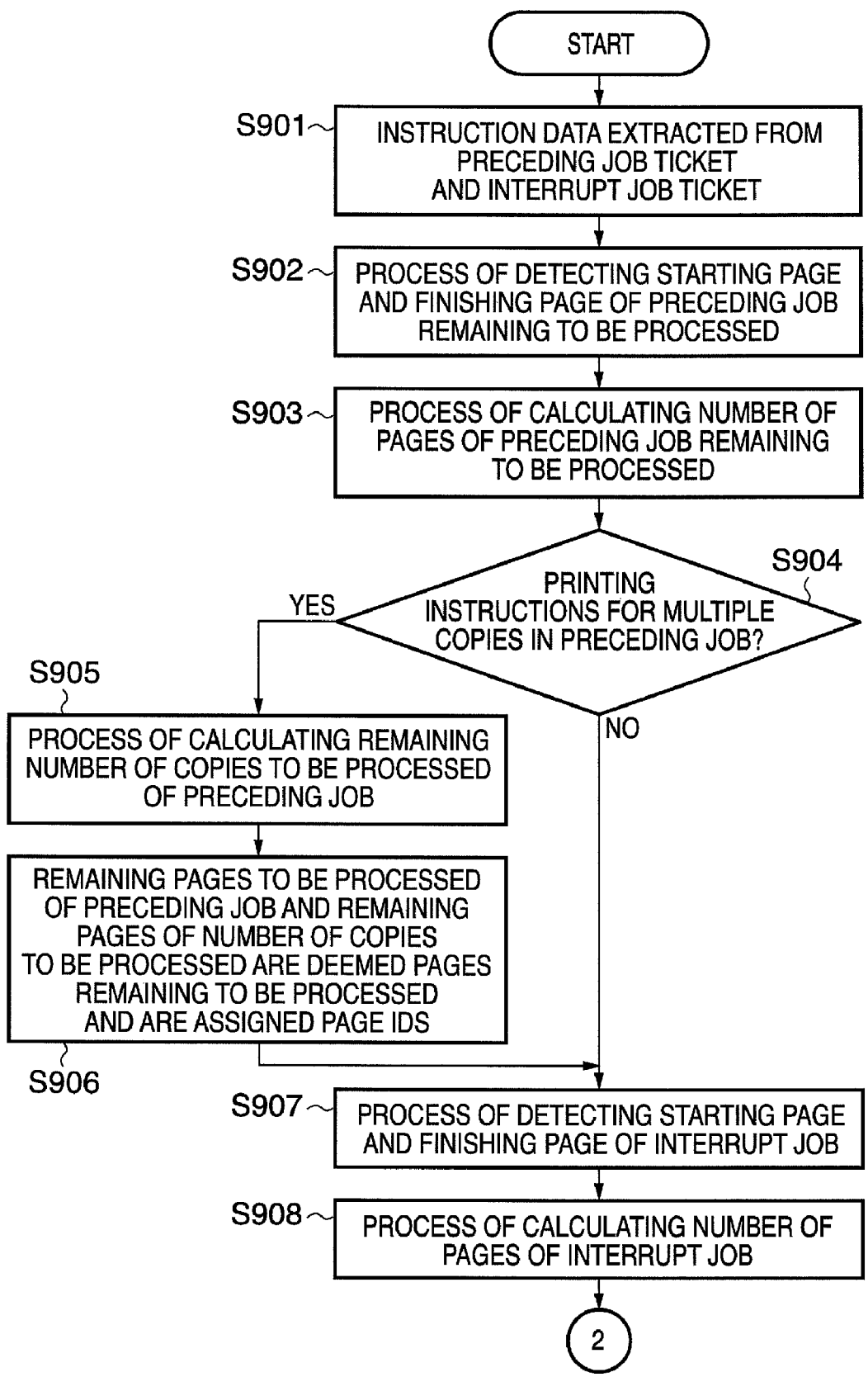
FIGS. 9A and 9B are a flowchart showing a process of generating a substitute job ticket by the substitute job ticket generating section according to a fourth embodiment.
Figure 9B:
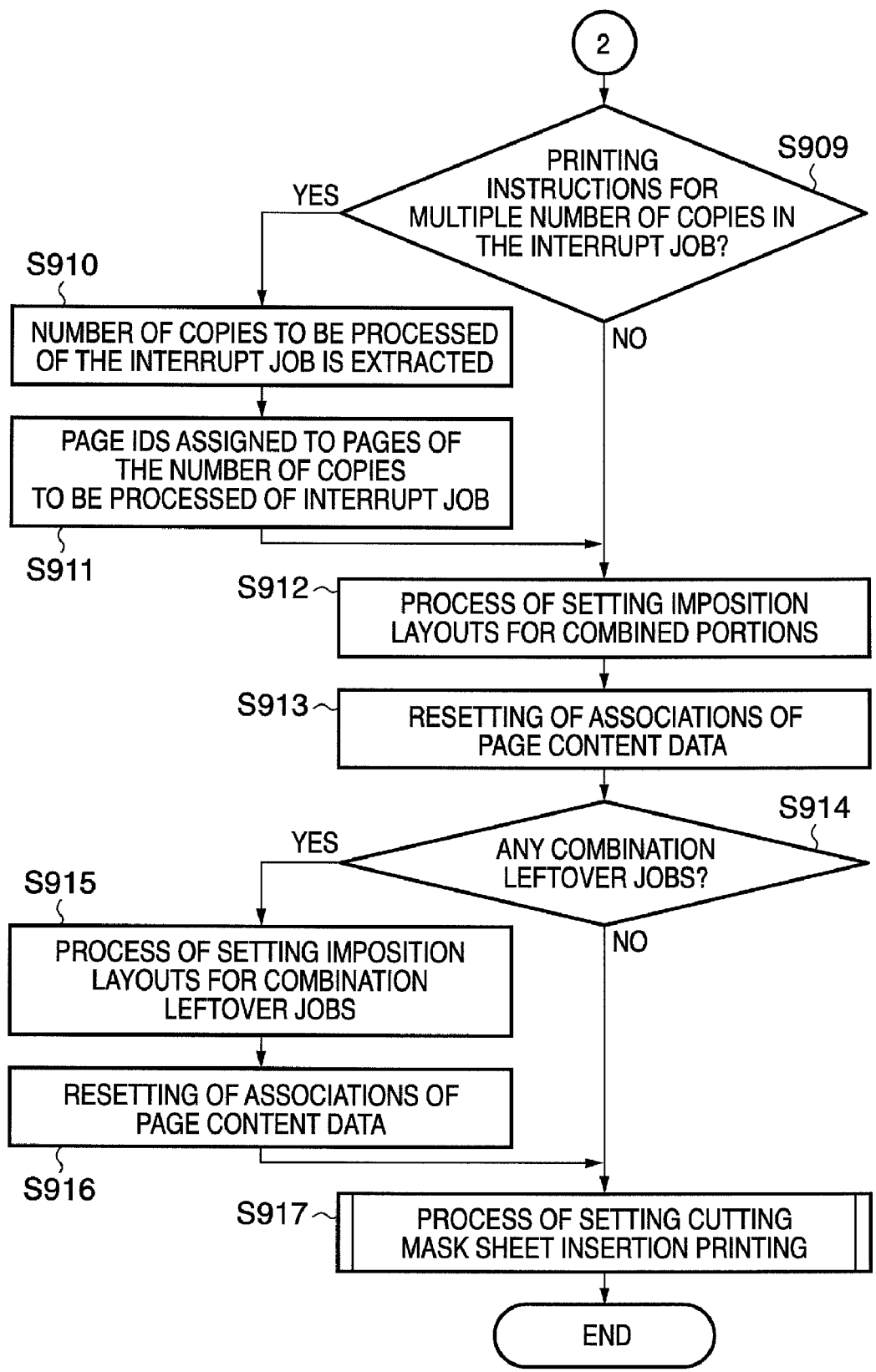

FIGS. 9A and 9B are a flowchart showing a process of generating a substitute job ticket by the substitute job ticket generating section according to the fourth embodiment. First, at step S901, the substitute job ticket generating section 110 of the MFP 207 extracts instructions and data from instruction data of the preceding job ticket and the interrupt job ticket. Then, at step S902, the starting page and finishing page of the unprocessed portion of the preceding job are detected from the extracted instruction data. Next, at step S903, the number of pages in the unprocessed portion of the preceding job is calculated from the detected starting page and finishing page of the unprocessed portion of the preceding job. Then, at step S904, a check is carried out as to whether or not there are printing instructions for multiple number of copies in the preceding job and when there are no printing instructions for multiple number of copies, the procedure proceeds to step S907.

On the other hand, when there are printing instructions for multiple number of copies, then at step S905 the remaining number of copies to be processed of the preceding job is calculated. Then, at step S906, the remaining pages to be processed of the preceding job and the remaining pages of the number of copies to be processed are deemed to be pages remaining to be processed and are assigned page IDs respectively so that each page of the remaining number of copies to be processed of the preceding job can be processed as a separate page.

For example, when there is an instruction to print five copies of the total 10 pages of the preceding job, if there are seven pages remaining to be processed and the remaining number of copies to be processed is four copies, then the page IDs are as follows. Namely, page IDs are set so that IDs [1-7] to IDs [5-10] are set for page 7 of the first copy to page 10 of the fifth copy.

Next, at step S907, the starting page and finishing page of the interrupt job are detected and, at step S908, the number of pages in the interrupt job is calculated from the detected starting page and finishing page of the interrupt job. Then, at step S909, a check is carried out as to whether or not there are printing instructions for multiple number of copies in the interrupt job and when there are no printing instructions for multiple number of copies, the procedure proceeds to step S912.

On the other hand, when there are printing instructions for multiple number of copies, then at step S910 the number of copies to be processed of the interrupt job is extracted. Then, at step S911, page IDs are assigned to each of the pages of the number of copies to be processed so that each page of the number of copies to be processed of the interrupt job can be processed as a separate page.

For example, when the instructions are for printing of three copies of the total four pages of the interrupt job, the page IDs are set so that IDs [1-1] to IDs [3-4] are set for page 1 of the first copy to page 4 of the third copy.

Next, at step S912, the imposition layout resetting section 112 determines imposition layouts for each sheet to be printed in the substitute job tickets and the newly imposed layout data is set in the substitute job tickets. It should be noted that then the imposition layout resetting section 112 determines the imposition layouts based on page numbers of jobs already calculated, instruction data extracted from each job, and the page IDs of the jobs that are already set if multiple number of copies is instructed.

At this time, in regard also to sheets of the preceding job that have been printed, settings are left in the substitute job tickets as processed instructions.

Next, at step S913, the page content data association resetting section 114 sets associations between the contents that constitute each sheet to be printed in the substitute job tickets and the page data (PDL). Then, at step S914, the substitute job ticket generating section 110 uses page information including page IDs in each job used when combining the interrupt job into the preceding job to investigate whether or not there is a combination leftover job.

If there is no combination leftover job as a result of the investigation, then the procedure proceeds to step S917, and if there is a combination leftover job, then the procedure proceeds to step S915. At step S915, the imposition layout resetting section 112 determines imposition layouts for the combination leftover job portions so that the combination leftover job portions are added to the printing instructions of the substitute job tickets and sets imposition layout data in the substitute job tickets. This process is carried out based on page numbers of jobs already calculated, instruction data extracted from each job, and the page IDs of the jobs that are already set if multiple number of copies is instructed.

Next, at step S916, the page content data association resetting section 114 sets associations between the contents that constitute each sheet to be printed in the substitute job tickets and the page data (PDL).

Then, at step S917, the cutting mask sheet insertion print setting section 115 sets an insertion timing for cutting mask sheet insertion printing for printing according to the substitute job tickets. A flowchart showing an example of details of the setting process for the insertion timing of insertion printing of the cutting mask sheet has been shown in FIG. 5, and therefore further description is omitted.

As described above, all pages are handled separately by assigning IDs to pages of the number of pages remaining to be processed+pages of the remaining number of copies to be processed, then substitute job tickets are generated and insertion printing of the cutting mask sheet is carried out. This enables cutting operator mistakes to be reduced and improves processing efficiency.

It should be noted that the present invention may be applied to a system constituted by multiple apparatuses (for example, such devices as a host computer, an interface device, a reader, and a printer) and may also be applied to an apparatus constituted by a single device (for example, a copier or a facsimile machine or the like). For example, the foregoing embodiments were described using a multifunction device as one example of a print control device, but there is no limitation to this and these may be applied to a job editing device (host, server) that carries out editing in which multiple sets of print data are arranged on a single sheet of paper.

Furthermore, a system or a device may be provided with a recording medium on which is recorded program code of software for achieving a function of the foregoing embodiments, and a computer (CPU or MPU) of this system or device may read out and execute the program code stored on the recording medium. It is evident that an object of the present invention may be achieved in this manner.

In this case, the actual program code that is read out from the recording medium achieves the functionality of the above-described embodiments, such that the recording medium on which the program code is stored constitutes the present invention.

Examples of recording media that can be used for providing the program code include a flexible disk, a hard disk, an optical disk, a magneto-optical disk, a CD-ROM, a CD-R, magnetic tape, a nonvolatile memory card, and a ROM or the like.

Furthermore, it is evident that the functionality of the foregoing embodiments may be achieved not only by executing program code read out by a computer, but also includes the following cases. Namely, this includes a case of having an OS (operating system) or the like that runs on a computer carries out part or all of the actual processing according to instructions of the program code such that the functionality of the foregoing embodiments is achieved by the processing thereof.

Further still, it is possible for the program code read out from the recording medium to be written onto a memory provided in an extension board inserted into the computer or an extension unit connected to the computer. It is evident that this may subsequently also include having a CPU or the like provided in the extension board or extension unit carry out a part or all of the actual processing according to instructions of the program code such that the functionality of the foregoing embodiments is achieved by the processing thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-159140, filed Jun. 7, 2006, which is hereby incorporated by reference herein in its entirety.

What is claimed is:

1. A device comprising:
   a first generating unit adapted to generate, from multiple sets of print data, multi-imposition print data in which the multiple sets of print data are arranged in a single sheet layout,
   a second generating unit adapted to generate cutting sheet data based on positions of the multiple sets of print data arranged in the single sheet layout in the generated multi-imposition print data, and
   a print control unit adapted to perform control such that the multi-imposition print data generated by the first generating unit and the cutting sheet data generated by the second generating unit are printed.

2. The device according to claim 1, wherein the print control unit performs control such that the multi-imposition print data and the cutting sheet data are printed continuously.

3. The device according to claim 1, wherein the first generating unit comprises:
   a first resetting unit adapted to carry out new imposition settings,
   a second resetting unit adapted to reassociate page content data, on which the newly imposed content is based, and
   a print setting unit adapted to set insertion printing instructions for inserting the cutting sheet into the multi-imposition print data.

4. The device according to claim 3, wherein the second generating unit generates cutting sheet data for masking areas where cutting is prohibited and distinguishing the areas from areas where cutting is permitted, based on the newly imposed layout settings and settings of the insertion printing instructions.

5. The device according to claim 3, wherein a job ticket of a preceding job being processed and an interrupt job that interrupts print processing are saved and a substitute job ticket is generated from each of the saved job tickets, and
   the second resetting unit mixes and reassociates page data of the interrupted job and page data of the interrupt job in the newly imposed layout of the substitute job ticket.

6. The device according to claim 3, wherein when a change occurs in the imposition layout of a sheet due to new imposition settings when a single job is generated by combining an interrupt job with a preceding job upon reception of the interrupt job while conducting printing of the preceding job, instruction settings are carried out for insertion printing immediately before a first sheet to be printed in the new imposition.

7. The device according to claim 3, wherein when an output bin is changed even though no new imposition settings are made by the first resetting unit, instruction settings are carried out for insertion printing before printing a first sheet of the output bin as an insertion timing of insertion printing of the cutting sheet.

8. The device according to claim 3, wherein when a comparison is made with a limitation sheet number of a sheet cutting device obtained from the sheet cutting device and a printing sheet number exceeds the limitation number of the sheet cutting device even though no new imposition settings are made by the first resetting unit, instruction settings are carried out for insertion printing to be performed again before printing a next sheet as an insertion timing of insertion printing of the cutting sheet.

9. A method comprising:
   generating, from multiple sets of print data, multi-imposition print data in which the multiple sets of print data are arranged in a single sheet layout;

generating cutting sheet data based on positions of the multiple sets of print data arranged in the single sheet layout in the generated multi-imposition print data; and performing control such that the generated multi-imposition print data and the generated cutting sheet data are printed.

10. The method according to claim 9, further comprising:

performing control such that the generated multi-imposition print data and the generated cutting sheet data are printed continuously.

11. The method according to claim 9, wherein the generating the multi-imposition print data comprises:

carrying out new imposition settings;

reassociating page content data, on which the newly imposed content is based; and setting insertion printing instructions for inserting the cutting sheet into the multi-imposition print data.

12. The method according to claim 11, further comprising:

generating cutting sheet data for masking areas where cutting is prohibited and distinguishing the areas from areas where cutting is permitted, based on the newly imposed layout settings and settings of the insertion printing instructions.

13. The method according to claim 11, wherein a job ticket of a preceding job being processed and an interrupt job that interrupts print processing are saved and a substitute job ticket is generated from each of the saved job tickets, and the reassociating page content data involves mixing and reassociating page data of the interrupted job and page data of the interrupt job in the newly imposed layout of the substitute job ticket.

14. The method according to claim 11, wherein when a change occurs in the imposition layout of a sheet due to new imposition settings when a single job is generated by combining an interrupt job with a preceding job upon reception of the interrupt job while conducting printing of the preceding job, instruction settings are carried out for insertion printing immediately before a first sheet to be printed in the new imposition.

15. The method according to claim 11, wherein when an output bin is changed even though no new imposition settings are made, instruction settings are carried out for insertion printing before printing a first sheet of the output bin as an insertion timing of insertion printing of the cutting sheet.

16. The method according to claim 11, wherein when a comparison is made with a limitation sheet number of a sheet cutting device obtained from the sheet cutting device and a printing sheet number exceeds the limitation number of the sheet cutting device even though no new imposition settings are made, instruction settings are carried out for insertion printing to be performed again before printing a next sheet as an insertion timing of insertion printing of the cutting sheet.

17. A computer-readable recording medium on which is recorded a program for executing on an apparatus the method according to claim 9.

* * * * *